US008929305B2

(12) United States Patent
Cho et al.

(10) Patent No.: US 8,929,305 B2
(45) Date of Patent: Jan. 6, 2015

(54) METHOD OF EFFICIENT RANGING PROCEDURE CONSIDERING RANGING PURPOSE IN BROADBAND WIRELESS ACCESS SYSTEM

(75) Inventors: Hee Jeong Cho, Anyang-si (KR); Ki Seon Ryu, Anyang-si (KR); Young Soo Yuk, Anyang-si (KR); Jin Sam Kwak, Anyang-si (KR); Hyun Woo Lee, Anyang-si (KR); Gi Won Park, Anyang-si (KR); Yong Ho Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 469 days.

(21) Appl. No.: 12/909,397

(22) Filed: Oct. 21, 2010

(65) Prior Publication Data

US 2011/0090856 A1 Apr. 21, 2011

Related U.S. Application Data

(60) Provisional application No. 61/253,822, filed on Oct. 21, 2009, provisional application No. 61/257,848, filed on Nov. 4, 2009, provisional application No. 61/258,216, filed on Nov. 5, 2009, provisional application No. 61/266,161, filed on Dec. 3, 2009, provisional application No. 61/287,196, filed on Dec. 17, 2009, provisional application No. 61/289,976, filed on Dec. 23, 2009, provisional application No. 61/305,555, filed on Feb. 18, 2010.

(30) Foreign Application Priority Data

Oct. 21, 2010 (KR) ......................... 10-2010-0102856

(51) Int. Cl.
*H04W 72/04* (2009.01)
*H04L 5/14* (2006.01)
*H04L 27/26* (2006.01)
*H04W 64/00* (2009.01)
*H04W 28/04* (2009.01)

(52) U.S. Cl.
CPC ............. *H04L 5/1469* (2013.01); *H04W 64/00* (2013.01); *H04L 27/2602* (2013.01); *H04W 28/04* (2013.01)
USPC ............................ 370/329; 370/328; 455/450

(58) Field of Classification Search
USPC ........................................................ 370/329
See application file for complete search history.

(56) References Cited

U.S. PATENT DOCUMENTS 6,636,496 B1 10/2003 Cho et al.
7,430,418 B2 * 9/2008 Kang et al. .................... 455/436
(Continued)

FOREIGN PATENT DOCUMENTS

CN 101465688 A 6/2009
JP 2002-524938 A1 8/2002
(Continued)

*Primary Examiner* — Yemane Mesfin
*Assistant Examiner* — Jeff Banthrongsack
(74) *Attorney, Agent, or Firm* — Birch, Stewart, Kolasch & Birch, LLP

(57) ABSTRACT

A broadband wireless access system and, more particularly, a method for a mobile station and a base station to perform an efficient ranging procedure considering a ranging purpose and a device for performing the same are disclosed herein. A method of a mobile station for performing ranging in a broadband wireless access system, the method includes the steps of transmitting a first ranging preamble code for requesting ranging to a base station through a first ranging opportunity of a first frame, and, when a first message is received from the base station before a timer indicating a limited time point is expired, wherein the first message including a response to the first ranging preamble code is transmitted during the limited time point, determining whether or not the ranging request is successfully made by using the first message.

9 Claims, 13 Drawing Sheets

(56) References Cited

U.S. PATENT DOCUMENTS

| | | |
|---|---|---|
| 7,515,559 B2 | 4/2009 | Koo et al. |
| 2007/0202882 A1* | 8/2007 | Ju et al. .......................... 455/450 |
| 2008/0102842 A1* | 5/2008 | Kim .............................. 455/442 |
| 2008/0232330 A1 | 9/2008 | Lee et al. |
| 2008/0259895 A1 | 10/2008 | Habetha et al. |
| 2008/0298315 A1 | 12/2008 | Ihm et al. |
| 2010/0111029 A1* | 5/2010 | Chou et al. ..................... 370/329 |

FOREIGN PATENT DOCUMENTS

| | | | |
|---|---|---|---|
| JP | 2006-515731 A | | 6/2006 |
| JP | 2007-520968 A | | 7/2007 |
| JP | 2009-514411 A | | 4/2009 |
| KR | 10-2008-0014418 | * | 2/2008 |
| KR | 10-2008-0014418 A | | 2/2008 |

* cited by examiner

METHOD OF EFFICIENT RANGING PROCEDURE CONSIDERING RANGING PURPOSE IN BROADBAND WIRELESS ACCESS SYSTEM

This application claims the benefit of the Korean Patent Application No. 10-2010-0102856, filed on Oct. 21, 2010, which is hereby incorporated by reference as if fully set forth herein.

This application also claims the benefit of U.S. Provisional Application Ser. Nos. 61/253,822, filed on Oct. 21, 2009, 61/257,848, filed on Nov. 4, 2009, 61/258,216, filed on Nov. 5, 2009, 61/266,161, filed on Dec. 3, 2009, 61/287,196, filed on Dec. 17, 2009, 61/289,976, filed on Dec. 23, 2009 and 61/305,555, filed on Feb. 18, 2010, the contents of which are hereby incorporated by reference in their entirety.

BACKGROUND OF THE INVENTION

1. Field of the Invention

The present invention relates a broadband wireless access system and, more particularly, to a method for a mobile station and a base station to perform an efficient ranging procedure considering a ranging purpose and a device for performing the same.

2. Discussion of the Related Art

The main standard established by the IEEE 802.16 Working Group includes the IEEE 802.16-2004, which is referred to as a Fixed WiMAX, and the IEEE 802.16e-2005 (hereinafter referred to as 16e), which is referred to a mobile WiMAX. The IEEE gave its final approval for the IEEE 802.16e-2005 on December 2005. The most current version of the mobile WiMAX technology is based upon standards including the IEEE 802.16-2004, the IEEE 802.16e-2005 (this document is included in the Corrigenda of the IEEE 802.16-2004), and the IEEE 802.16-2004/Corrigenda/D8. Currently, a standardization procedure of the IEEE 802.16m for a next generation mobile WiMAX is in process by TGm within the IEEE 802.16 Working Group.

Among the process steps for performing a first (or initial) net registration procedure, a step of adjusting transmission parameters (i.e., frequency offset, time offset, transmission power) performed by the mobile station in order to perform an uplink communication with the base station is referred to as "initial ranging". And, after performing the net registration procedure, the mobile station performs periodic ranging in order to continuously maintain the uplink communication with the base station. Additionally, other ranging types include handover ranging enabling the mobile station to simplify procedures during handover operation, and bandwidth-request ranging enabling the mobile station to request for an uplink bandwidth when data that are to be transmitted have been generated.

In a broadband wireless access system, when performing a ranging process in accordance with each ranging type, a CDMA code (or ranging preamble) group and a region to which the CDMA code is to be transmitted are allocated (or assigned) by the network through a channel (e.g., UL-MAP) broadcasting system information. Accordingly, for example, in order for the mobile station to perform handover ranging, the mobile station should request for handover ranging, by selecting a specific code among the CDMA codes for handover ranging, and by transmitting the selected code to the network through initial raging and handover ranging regions. By using this method, the network may be capable of identifying different ranging types through the received CDMA code and the section to which the CDMA code is transmitted.

More specifically, in order to perform initial ranging, the mobile station of the IEEE 802.16m standard (AMS) acquires downlink synchronization with the base station, wherein the base station becomes the target for performing the ranging process, and then receives an uplink transmission parameter. Depending upon a random back-off, the mobile station selects a ranging slot (or ranging opportunity) and randomly selects an initial ranging preamble code, thereby transmitting the randomly selected initial ranging preamble code to the selected ranging slot. The base station receiving the ranging preamble code transmits a ranging acknowledgement (AAI_RNG-ACK) message to the mobile station. Herein, the ranging acknowledgement message may include a ranging preamble code transmitted by one or more mobile stations in a predetermined frame, reception state of the code, and a physical compensation value based upon the reception status.

More specifically, when the base station receives ranging preamble codes from the mobile station, as a response to the received ranging preamble codes, the base station transmits allocation (or assignment) information of the AAI_RNG-ACK message using a Broadcast Masking Code to the mobile station through a broadcast assignment A-MAP IE. When an AAI_RNG-ACK message is transmitted to a specific mobile station by non-request, allocation (or assignment) information is transmitted to the mobile station through a DL basic assignment A-MAP IE using an unicast STID.

When the mobile station receives a ranging acknowledgment message and verifies the ranging acknowledgement bitmap of the corresponding message, in case there are no successively decoded ranging preamble code existing in the ranging slot selected by the mobile station, or in case there are no response to any initial ranging attempts made by the mobile station included in the ranging acknowledgement message, the mobile station may determine that the initial ranging processes attempted by the mobile station itself has failed. Accordingly, the mobile station restarts the initial ranging procedure.

In case the initial ranging is successfully received, the base station may provide the following three difference types of responses to the mobile station through the AAI_RNG-ACK message. First of all, in case the ranging status is 'continue', a physical compensation value is included in the corresponding message. Secondly, in case the ranging status is 'success', the base station assigns (or allocates) uplink resource for transmitting a ranging request message. At this point, a physical compensation value may be further included. Finally, in case the ranging status is 'abort', the base station may request the mobile station to stop the ranging procedure for a predetermined period of time.

In case the ranging status is 'continue', the mobile station performs a quick ranging procedure using the physical compensation value included in the AAI_RNG-ACK message. And, in case the ranging status is 'success', the mobile station is assigned with an uplink resource from the base station and transmits an AAI_RNG-REQ message through the assigned uplink resource.

The AAI_RNG-ACK message corresponds to a response to initial ranging as well as handover/periodic ranging. The base station transmits the corresponding message within a pre-defined time point (i.e., section: transmission offset).

In case of the IEEE 802.16m system, the handover procedure should be completed within a handover interruption time (30 ms) upon request.

Therefore, since the operations belonging to the handover procedure should be performed within minimum delay, as one of the operations that can be performed during the handover process, the base station should quickly transmit an AAI_RNG-ACK message to the mobile station as a response to the handover ranging, so that the mobile station can quickly acknowledge whether or not the handover ranging preamble code transmitted by the use equipment itself has been received. At this point, in light of the overhead, it may be inefficient to define the transmission point of an AAI_RNG-ACK message for the initial/periodic ranging to have the same transmission point of the AAI_RNG-ACK message for the handover ranging. Accordingly, the transmission point and procedure of differentiated AAI_RNG-ACK messages should be defined in based upon each ranging purpose.

SUMMARY OF THE INVENTION

Accordingly, the present invention is directed to provide a method for a mobile station and a base station to perform an efficient ranging procedure considering a ranging purpose and a device for performing the same that substantially obviate one or more problems due to limitations and disadvantages of the related art.

Another object of the present invention is to provide a method for a mobile station and a base station to perform an efficient ranging procedure considering a ranging purpose and a device for performing the same that can efficiently perform the ranging process.

A further object of the present invention is to define a transmission point of a ranging acknowledgement message considering a ranging purpose.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to an embodiment of the present invention, in a method of a mobile station for performing ranging in a broadband wireless access system, the method for performing ranging includes the steps of transmitting a first ranging preamble code for requesting ranging to a base station through a first ranging opportunity of a first frame, and, when a first message is received from the base station before a timer indicating a limited time point is expired, wherein the first message including a response to the first ranging preamble code is transmitted during the limited time point, determining whether or not the ranging request is successfully made by using the first message.

At this point, in case a response to the first ranging preamble code is not included in the first message, or in case the first message is not received before the timer expires, the step of determining whether or not the ranging request is successfully made may be performed so that, when uplink assignment information for transmitting a second message to the base station is received from the base station with respect to the first ranging preamble code before the timer expires, the ranging request can be determined to be successful, and when the uplink assignment information is not received before the timer expires, the ranging request can be determined to be failed.

Also, the first message includes a frame indicator indicating at least one frame including ranging opportunities that the first message refers to, a bitmap (RNG-ACK Bitmap) indicating a decoding status of a code received in the ranging opportunities of each frame indicated by the frame indicator field, and at least one ranging preamble code successfully decoded in the ranging opportunities.

And, in the step of determining whether or not the ranging request is successfully made, when a frame indicator indicating the first frame is included in the received first message, when a bit for the first opportunity in a bitmap (RNG-ACK Bitmap) for the first frame is set to 1, and when the first ranging preamble code is included, the ranging request can be determined to be successful.

Furthermore, the first message may be a ranging acknowledgement (AAI_RNG-ACK) message, the second message may be a ranging request (AAI_RNG-ACK) message, and the timer may be a T31 timer.

According to another embodiment of the present invention, in a method of a mobile station for performing ranging in a broadband wireless access system, the method for performing ranging includes the steps of detecting a ranging preamble code through at least one ranging opportunity, and, based upon the detected result, transmitting a first message that includes a response to a reception status of the ranging preamble code to at least one mobile station from a frame that includes ranging opportunities, each having at least one ranging preamble code detected therefrom, before a predetermined timer expires.

At this point, the method may further include a step of transmitting uplink resource assignment information for transmitting a second message to a first mobile station, wherein, among the at least one detected ranging preamble code, the first mobile station has transmitted a successfully received first ranging preamble code that does not require any uplink transmission parameter correction. And, herein, a response to the first ranging preamble code may be excluded from the first message.

Also, the first message includes a frame indicator indicating at least one frame including ranging opportunities that the first message refers to, a bitmap (RNG-ACK Bitmap) indicating a decoding status of a code received in the ranging opportunities of each frame indicated by the frame indicator field, and at least one ranging preamble code successfully decoded in the ranging opportunities.

And, the frame indicator includes at least one bit indicating a number of a super-frame including a frame indicated by the frame indicator, and at least one bit indicating a number of the frame within the super-frame.

Furthermore, the first message may be a ranging acknowledgement (AAI_RNG-ACK) message, the second message may be a ranging request (AAI_RNG-ACK) message, and the timer may be a T31 timer.

According to yet another embodiment of the present invention, in a mobile station device for performing ranging in a broadband wireless access system, a mobile station includes a processor, and a radio frequency (RF) module configured to transmit and receive radio frequency signals to and from the outside depending upon a control of the processor, wherein the processor transmits a first ranging preamble code for requesting ranging to a base station through a first ranging opportunity of a first frame, and wherein, when a first message is received from the base station before a timer indicating a limited time point is expired, wherein the first message including a response to the first ranging preamble code is transmitted during the limited time point, the processor determines whether or not the ranging request is successfully made by using the first message.

At this point, in case a response to the first ranging preamble code is not included in the first message, or in case the first message is not received before the timer expires, the processor determines whether or not the ranging request is successfully made is performed so that, when uplink assignment information for transmitting a second message to the base station is received from the base station with respect to the first ranging preamble code before the timer expires, the ranging request can be determined to be successful, and when the uplink assignment information is not received before the timer expires, the ranging request can be determined to be failed.

Also, the first message includes a frame indicator indicating at least one frame including ranging opportunities that the first message refers to, a bitmap (RNG-ACK Bitmap) indicating a decoding status of a code received in the ranging opportunities of each frame indicated by the frame indicator field, and at least one ranging preamble code successfully decoded in the ranging opportunities.

And, when a frame indicator indicating the first frame is included in the received first message, when a bit for the first opportunity in a bitmap (RNG-ACK Bitmap) for the first frame is set to 1, and when the first ranging preamble code is included, the processor can determine the ranging request to be successful.

Furthermore, the first message may be a ranging acknowledgement (AAI_RNG-ACK) message, the second message may be a ranging request (AAI_RNG-ACK) message, and the timer may be a T31 timer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
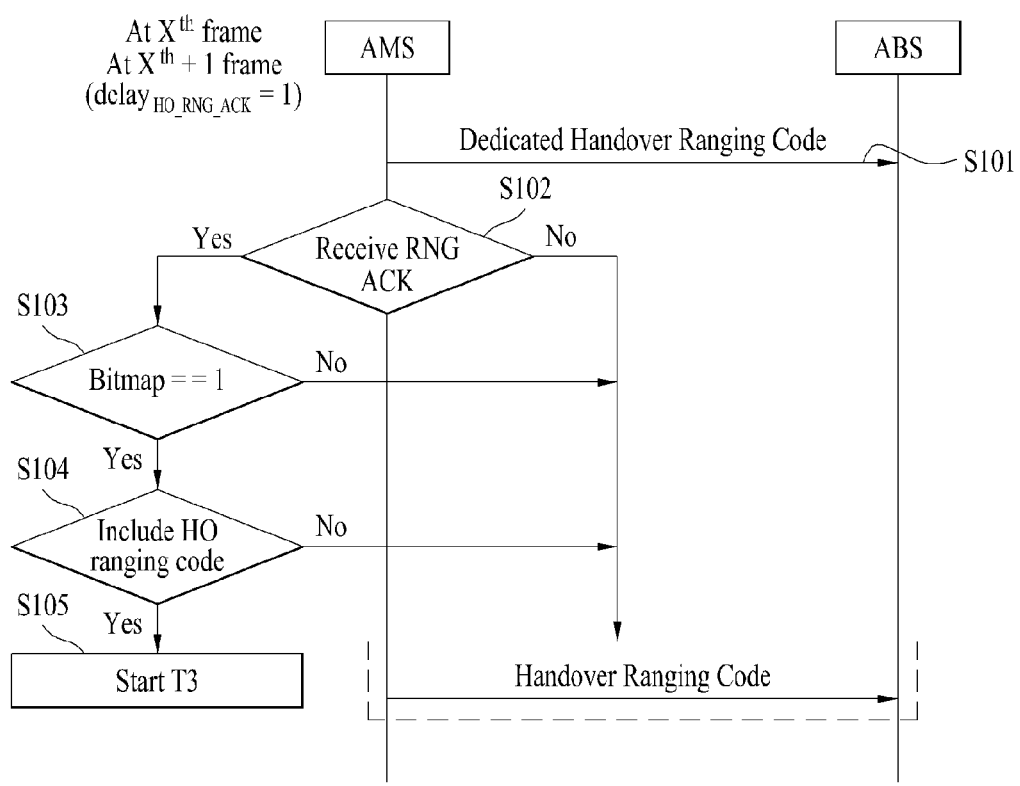
FIG. 1 illustrates an exemplary procedure for performing handover ranging according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

The present invention relates a wireless access system. Hereinafter, the method for efficiently performing a ranging procedure considering a ranging purpose and the device for performing the same will be disclosed according to the preferred embodiments of the present invention.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between the base station and the terminal (or mobile station). Herein, the base station may refer to a terminal node of the network that performs direct communication with the terminal. Occasionally, in the description of the present invention, particular operations of the present invention that are described as being performed by the base station may also be performed by an upper node of the base station.

More specifically, in a network consisting of multiple network nodes including the base station, it is apparent that diverse operations that are performed in order to communicate with the terminal may be performed by the base station or b network nodes other than the base station. Herein, the term 'Base Station (BS)' may be replaced by other terms, such as fixed station, Node B, eNode B (eNB), Access Point (AP), Advanced BS (ABS), and so on. Additionally, the term 'Terminal' may be replaced by terms including UE (User Equipment), MS (Mobile Station), MSS (Mobile Subscriber Station), Advanced MS (AMS), SS (Subscriber Station), and so on.

The embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

Herein, the embodiments of the present invention may be supported by at least one the disclosed standard documents for wireless access systems including the IEEE 802 system, the 3GPP LTE system, and the 3GPP2 system. More specifically, among the embodiments of the present invention, partial operation steps or structures of the present invention, which have been omitted from the description of the present invention in order to specify and clarify the technical scope and spirit of the present invention may also be supported by the above-described standard documents. Furthermore, the terms disclosed in the description of the present invention may be described based upon the above-mentioned standard documents. Most particularly, the embodiments of the present invention may be supported by at least one of the standard documents for the IEEE 802.16 system, such as P802.16-2004, P802.16e-2005, P802.16Rev2, and IEEE P802.16m.

The specific terms used in the following description of the present invention are provided to facilitate the understanding of the present invention. And, therefore, without deviating from the technical scope and spirit of the present invention, such specific terms may also be varied and/or replaced by other terms.

First Embodiment

A method of performing a ranging procedure, wherein a transmission point of a ranging acknowledgement message based upon the time point at which a base station received a ranging preamble code from a mobile station is decided, is provided according to the first embodiment of the present invention.

Hereinafter, the process of performing a handover ranging procedure according to the embodiment of the present invention will be described in detail.

First of all, a mobile station selects a ranging channel (i.e., a ranging opportunity) among multiple ranging channels assigned to an $x^{th}$ frame. Then, the mobile station transmits a handover ranging preamble code through the selected ranging channel.

The base station that has received a handover ranging preamble code through the corresponding handover ranging opportunity of the $x^{th}$ frame transmits an AAI_RNG-ACK message to the mobile station before the time set up from the $x^{th}$ frame for the handover ranging procedure (hereinafter referred to as "$delay_{HO\_RNG\_ACK}$" for simplicity) is elapsed or at the point where the set-up time is elapsed (i.e., at/in/within $x^{th}+delay_{HO\_RNG\_ACK}$).

Herein, the handover ranging preamble code includes a contention based handover ranging preamble code as well as a handover purpose dedicated ranging preamble code.

Hereinafter, the $delay_{HO\_RNG\_ACK}$ according to the embodiment of the present invention will be defined.

The $delay_{HO\_RNG\_ACK}$ may be referred to as a ranging acknowledgement transmission time (RNG_ACK_TX_Time) or a T31 timer.

Herein, the $delay_{HO\_RNG\_ACK}$ may be set up as 1 frame or more, and the $delay_{HO\_RNG\_ACK}$ may be defined as a frame unit or a super-frame unit.

Additionally, the $delay_{HO\_RNG\_ACK}$ may define a value fixed in advance between the mobile station and the base station, or the $delay_{HO\_RNG\_ACK}$ may be transmitted to the mobile station through a medium access control (MAC) message (e.g., AAI_HO-CMD message) associated with a handover being transmitted to the mobile station from a serving base station.

In case a MAC message us being used, $delay_{HO\_RNG\_ACK}$ information decided by an exchange of information between the serving base station and a target base station is delivered to multiple mobile stations. At this point, information on the $delay_{HO\_RNG\_ACK}$ value may be included only when a CDMA RNG FLAG field is set to '1' in the AAI_HO-CMD message, i.e., only when the corresponding message designates (or directs) the performance of a handover ranging process. By using this method, the target base station may change the transmission point of the AAI_RNG-ACK message in accordance with a traffic load.

The target base station may apply a different $delay_{HO\_RNG\_ACK}$ value for each specific mobile station performing handover (e.g., when a designated ranging preamble code is allocated), or the target base station may apply the same delayHO_RNG_ACK value for all specific mobile station performing handover (e.g., when a designated ranging preamble code is not allocated).

In case the mobile station cannot acquire the $delay_{HO\_RNG\_ACK}$ information through the MAC message, the mobile station may determine that the AAI_RNG-ACK message is transmitted to the base station in accordance with a pre-decided $delay_{HO\_RNG\_ACK}$ value. At this point, it is preferable that the $delay_{HO\_RNG\_ACK}$ value being delivered through an AAI_HO-CMD message is smaller than or equal to the pre-decided $delay_{HO\_RNG\_ACK}$ value.

For example, mobile station A received an AAI_HO-CMD message having the $delay_{HO\_RNG\_ACK}$ information set to 1 frame, and mobile station B did not receive the corresponding information. At this point, it is assumed that a pre-decided $delay_{HO\_RNG\_ACK}$ value, which is applied when a $delay_{HO\_RNG\_ACK}$ value is not received from the base station, is equal to 1 super-frame. In this case, when the mobile station A transmits a ranging preamble code, and yet when the mobile station A fails to receive an AAI_RNG-ACK message signifying that the base station has successfully received the transmitted ranging preamble code in a next frame, the mobile station A re-attempts to perform the ranging process. Conversely, when the mobile station B transmits a ranging preamble code to the base station, and yet when the mobile station B fails to receive an AAI_RNG-ACK message signifying that the base station has successfully received the transmitted ranging preamble code until a next super-frame, the mobile station B re-attempts to perform the ranging process. Evidently, it is assumed in the above-described example that uplink resource information (UL grant) is not provided to the mobile station up to the time point designated by the delay$_{HO\_RNG\_ACK}$ value, which is applied to each mobile station. When the base station allocates an uplink resource to the mobile station, this implicitly indicates that the base station has successfully received the ranging preamble code transmitted by the corresponding mobile station.

Hereinafter, the AAI_RNG-ACK message according to the embodiment of the present invention will not be described in detail.

The AAI_RNG-ACK message includes bitmap information indicating a decoding status of a ranging preamble code received during each ranging (RNG) opportunity of a specific frame, and all handover ranging preamble codes that are successfully received through the ranging opportunities within the corresponding frame. At this point, the base station may omit the ranging preamble code of the mobile station, to which resource for transmitting the AAI_RNG-REQ is allocated, before the transmission time point of the AAI_RNG-ACK.

In the embodiment of the present invention, depending upon whether or not the mobile station receives an AAI_RNG-ACK message, which includes a response to a code transmitted to a ranging opportunity selected by the mobile station itself, at or within a time point designated by the delayHO_RNG_ACK value, the operations of the mobile station may be categorized as follows.

First of all, the mobile station receives an AAI_RNG-ACK message, and 1) when the above-described bitmap information indicates that there does not exist any ranging preamble code received by a ranging opportunity, wherein the ranging opportunity is selected by the mobile station, or 2) when a ranging preamble code transmitted by the mobile station with respect to the corresponding ranging opportunity is not included in the AAI_RNG-ACK message, and when the mobile station is not assigned with an uplink resource for the transmission of the AAI_RNG-ACK message from the base station, the mobile station may determine such instances as an explicit negative acknowledgement (explicit-NACK) response.

Conversely, when the mobile station fails to receive an AAI_RNG-ACK message, and when the mobile station fails to be assigned with an uplink resource for the AAI_RNG-ACK message transmission from the base station, the mobile station may determine such failure as an implicit negative acknowledgement (implicit-NACK) response.

Meanwhile, when the mobile station receives the AAI_RNG-ACK message, when a ranging preamble code having the above-described bitmap information received in the ranging opportunity selected by the mobile station exists, and when the ranging preamble code transmitted by the mobile station with respect to the corresponding ranging opportunity is included in the AAI_RNG-ACK message, the mobile station may determine such instances as an acknowledgement (ACK), i.e., the mobile station may determine that the ranging preamble code transmitted by the mobile station itself has been successfully received. Although the mobile station has determined a case as an ACK, if the mobile station fails to be assigned with an uplink resource for transmitting the AAI_RNG-ACK message from the base station, the mobile station starts the T3 timer. Thereafter, if the mobile station is assigned with the uplink resource before the time set on the T3 timer expires, the mobile station may stop the T3 timer. However, when the mobile station fails to be assigned with the uplink resource before the time set on the T3 timer expires, or when the mobile station determines a negative acknowledgment (i.e., implicit/explicit NACK), the mobile station determines that the corresponding ranging procedure has failed. Accordingly, the mobile station may restart the ranging procedure.

Hereinafter, the ranging procedure according to the information included in the above-described delay$_{HO\_RNG\_ACK}$ and AAI_RNG-ACK message will now be described in detail with reference to FIG. 1.

FIG. 1 illustrates an exemplary procedure for performing handover ranging according to an embodiment of the present invention.

It is assumed in FIG. 1 that the delay$_{HO\_RNG\_ACK}$ corresponds to 1 frame, and that the base station does not transmit any uplink allocation (or assignment) information for transmitting an AAI_RNG-REQ message to the mobile station within a period of Xth+delay$_{HO\_RNG\_ACK}$.

Referring to FIG. 1, the mobile station transmits a handover ranging target to the base station through a handover ranging opportunity, which the mobile station has randomly selected (in case of a dedicated ranging, assigned as a dedicated handover ranging target) in an $X^{th}$ frame (S101).

The mobile station waits for the AAI_RNG-ACK message to be transmitted from the base station up until the time point (i.e., Xth+delay$_{HO\_RNG\_ACK}$) designated by the delay$_{HO\_RNG\_ACK}$ is elapsed (S102).

If the AAI_RNG-ACK message is received within the above-described time point, the mobile station determines whether or not a bit corresponding to the ranging opportunity, to which the mobile station has transmitted a ranging preamble code, is set to '1' in a bitmap (RNG-ACK) for the $X^{th}$ frame within the corresponding AAI_RNG-ACK message (S103).

Then, if the corresponding bit of the bitmap is set to '1', the mobile station determines whether or not the ranging preamble code, which the mobile station has transmitted, is included in the corresponding AAI_RNG-ACK message (S104).

In case the ranging preamble code transmitted by the mobile station itself is included in the message, the mobile station determines that the ranging preamble code has been successfully transmitted (i.e., ACK). Then, the mobile station starts the T3 timer and waits for the assignment of an uplink resource in order to transmit an AAI_RNG-REQ message.

Based upon the results of step S102 to step S104, if at least one result is 'no', the mobile station then determines that the transmission of the ranging preamble code has failed. Accordingly, the mobile station re-transmits a ranging preamble code to the target base station.

Hereinafter, the instance of a delay$_{HO\_RNG\_ACK}$ parameter being allocated (or assigned) through an AAI_HO-CMD message will now be described in detail.

During a handover preparation phase (or step), when a handover ranging using a ranging preamble code (CDMA-based HO ranging) is not omitted, the target base station notifies the serving base station of the information on the time point at which the AAI_RNG-ACK message is to be transmitted. Then, the serving base station notifies the same to the mobile station through the AAI_HO-CMD message.

During the HO execution phase (or step), the mobile station transmits a ranging preamble code to the target base station. At this point, if any one of the following conditions is met, the mobile station restarts the handover ranging procedure.

If a UL_grant for transmitting an AAI_RNG-ACK message or AAI_RNG-REQ message, which includes the corresponding ranging preamble code in a ranging opportunity to which the mobile station has transmitted the ranging preamble code, fails to be received before the time set on the T3 timer expires. Herein, the failure to receive the AAI_RNG-REQ message refers to when an AAI_RNG-ACK message having a bit, which corresponds to the ranging opportunity selected by the mobile station, set to '1' in an RNG_ACK bitmap fails to be received before the time set on the T3 timer expires, or refers to when a code transmitted by the mobile station is not included even when the corresponding bit is set to '1' in the AAI_RNG-ACK message.

Although the transmission of the ranging preamble code has been successful, if a UL_grant for transmitting an AAI_RNG-REQ message fails to be received before the time set on the T3 timer expires, or if, after transmitting the AAI_RNG-REQ message, an AAI_RNG-RSP message fails to be received before the time set on the T3 timer expires.

If an AAI_RNG-REQ/RSP exchange is not completed within 128 frames.

During the HO execution phase (or step), the base station should transmit the AAI_RNG-ACK message from a frame, wherein at least one ranging preamble code has been detected, before the time set on the T31 timer expires. If the base station transmits the UL grant with respect to the received ranging preamble code before the time set on the T31 timer expires, the response to the corresponding ranging preamble code may be omitted from the AAI_RNG-ACK message. Alternatively, if there is no successfully received ranging preamble code, the base station may omit the transmission of the AAI_RNG-ACK message.

Hereinafter, the process steps of the handover ranging procedure corresponding to when the target base station notifies information on the time point at which the AAI_RNG-ACK message is to be transmitted to the serving base station, will now be described in detail with reference to FIG. 2 to FIG. 5. In FIG. 2 to FIG. 5, the T31 timer will be marked as a ranging acknowledgement transmission time (RNG_ACK_TX_Time).

Figure 2:
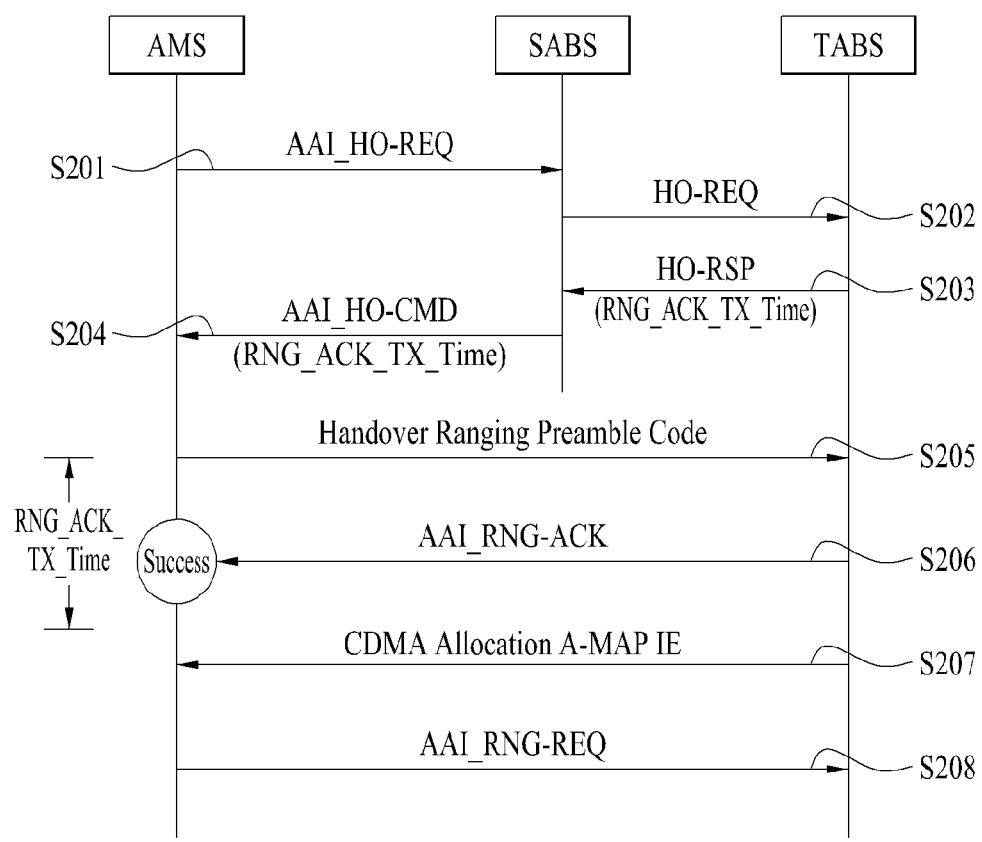
FIG. 2 illustrates another exemplary procedure for performing handover ranging according to an embodiment of the present invention.

FIG. 2 illustrates another exemplary procedure for performing handover ranging according to an embodiment of the present invention.

Referring to FIG. 2, the mobile station transmits a handover request (AAI_HO-REQ) message to the serving base station in order to perform handover to the target base station (S201).

Accordingly, the serving base station performs a parameter negotiation for handover with the target base station (S202 and S203). At this point, RNG_ACK_TX_Time information, which indicates the time when the AAI_RNG-ACK message is to be transmitted through a handover response backbone message, is transmitted from the target base station to the serving base station (S203).

The serving base station transmits the RNG_ACK_TX_Time information received from the target base station to the mobile station through an AAI_HO-CMD message (S204).

The mobile station receiving the AAI_HO-CMD message transmits a handover ranging preamble code to the target base station, and, then, the mobile station waits for the AAI_RNG-ACK message before the time point indicated by the RNG_ACK_TX_Time information is expired (S205).

The mobile station receives the AAI_RNG-ACK message, which indicates that the ranging status is 'success', from the target base station as a response to the ranging preamble code transmitted by the mobile station itself (S206).

Herein, the AAI_RNG-ACK message has a bit, which corresponds to the ranging opportunity to which the mobile station has transmitted a ranging preamble code, set to '1' in a bitmap (RNG-ACK Bitmap) corresponding to a frame to which the mobile station has transmitted the ranging preamble code. Herein, the transmitted ranging preamble code is included in the corresponding message.

Thereafter, the target base station allocates (or assigns) an uplink resource for transmitting the AAI_RNG-REQ message to the mobile station (S207), and the mobile station uses the corresponding resource to transmit the AAI_RNG-REQ message to the target base station (S208).

Figure 3:
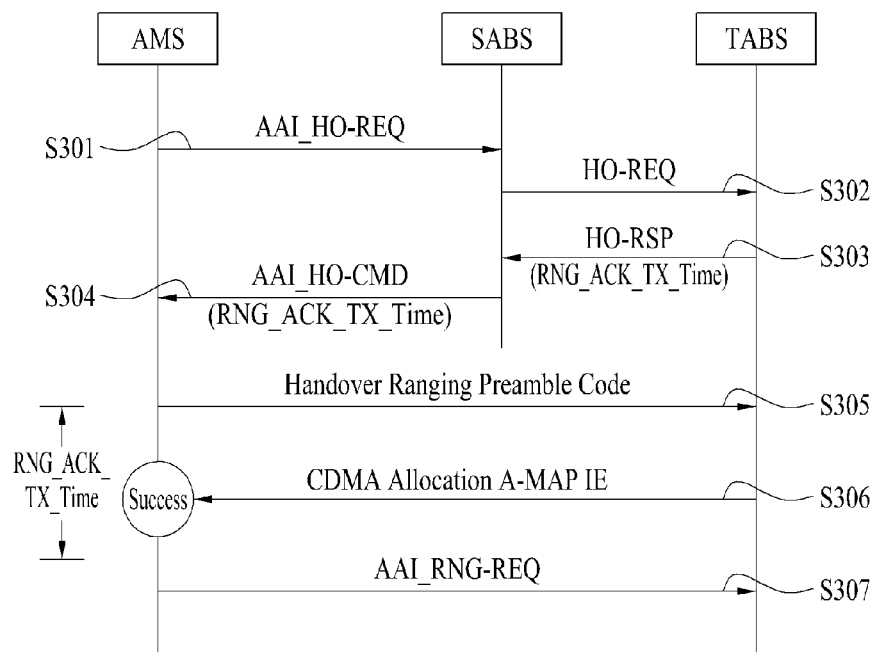
FIG. 3 illustrates yet another exemplary procedure for performing handover ranging according to an embodiment of the present invention.

FIG. 3 illustrates yet another exemplary procedure for performing handover ranging according to an embodiment of the present invention.

Referring to FIG. 3, since the process steps S301 to S305 are identical to the process steps S201 to S205 of FIG. 2, the identical description of the corresponding process steps will be omitted for the simplicity of the description of the present invention.

In step S306, before the time indicated by the RNG_ACK_TX_Time information is expired, the target base station transmits information on the uplink resource allocation for transmitting the AAI_RNG-REQ message to the mobile station (S306).

Accordingly, even when the mobile station fails to receive the AAI_RNG-ACK message, the mobile station may determine the above-described transmission of the uplink resource allocation information as an implicit ACK for the handover ranging preamble code transmitted by the mobile station itself, and, then, the mobile station transmits the AAI_RNG-REQ message to the target base station through the allocated uplink resource (S307).

Figure 4:
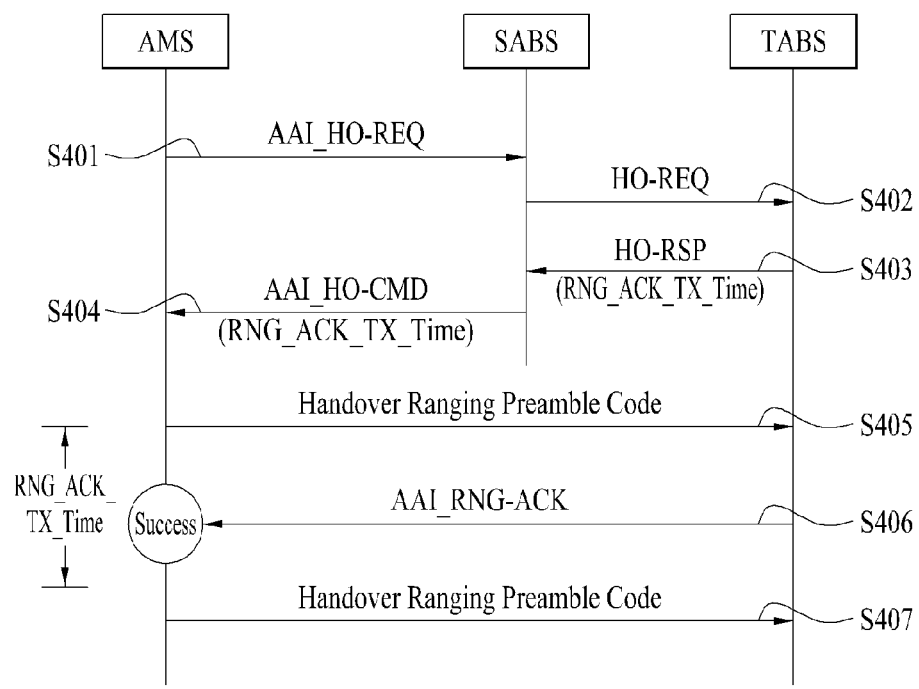
FIG. 4 illustrates yet another exemplary procedure for performing handover ranging according to an embodiment of the present invention.

FIG. 4 illustrates yet another exemplary procedure for performing handover ranging according to an embodiment of the present invention.

Referring to FIG. 4, since the process steps S401 to S405 are identical to the process steps S201 to S205 of FIG. 2, the identical description of the corresponding process steps will be omitted for the simplicity of the description of the present invention.

The mobile station receives an AAI_RNG-ACK message, which indicates that the ranging status is 'continue', from the target base station (S406).

Herein, the AAI_RNG-ACK message includes a bit, which corresponds to the ranging opportunity to which the mobile station has transmitted a ranging preamble code, set to '1' among the bits of a bitmap (RNG-ACK Bitmap) corresponding to a frame to which the mobile station has transmitted the ranging preamble code. Herein, the transmitted ranging preamble code is included in the corresponding message. Furthermore, the AAI_RNG-ACK message indicating that the ranging status is 'continue' may further include information on a physical parameter compensation value.

Accordingly, the mobile station may apply the physical parameter compensation value information so as to re-transmit the ranging preamble code to the target base station (S407).

Figure 5:
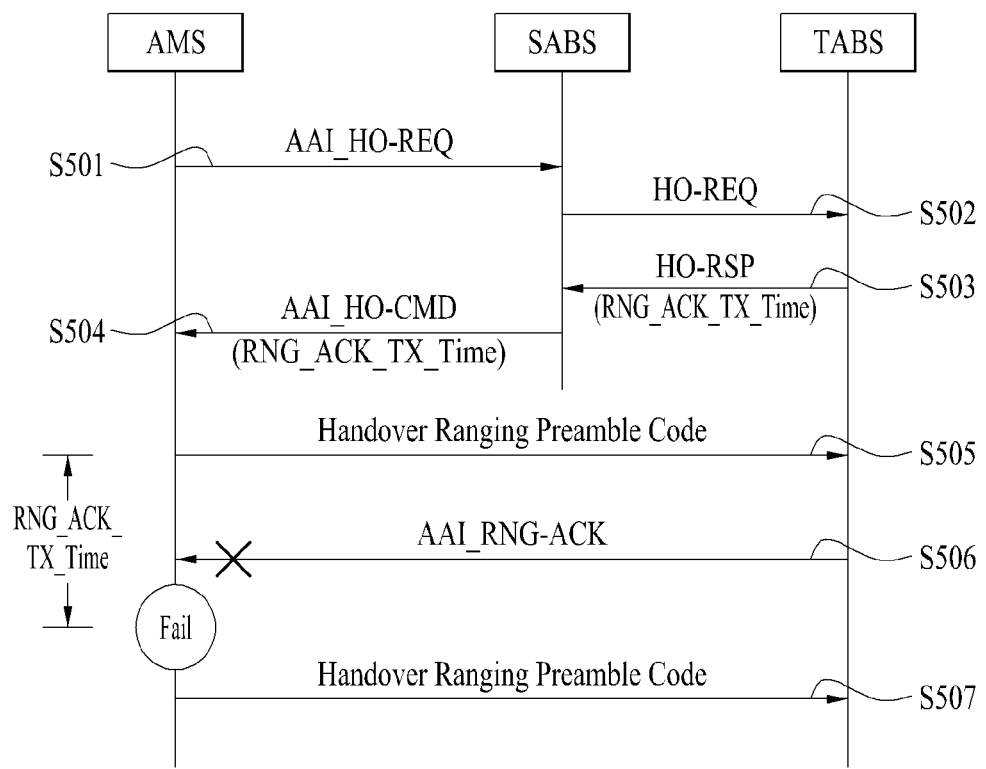
FIG. 5 illustrates yet another exemplary procedure for performing handover ranging according to an embodiment of the present invention.

FIG. 5 illustrates yet another exemplary procedure for performing handover ranging according to an embodiment of the present invention.

Referring to FIG. 5, since the process steps S501 to S505 are identical to the process steps S201 to S205 of FIG. 2, the identical description of the corresponding process steps will be omitted for the simplicity of the description of the present invention.

When the mobile station fails to receive an AAI_RNG-ACK message from the base station up until the time point designated by the RNG_ACK_TX_Time information, the mobile station is fails to be assigned with the uplink resource for transmitting an AAI_RNG-REQ message. Therefore, the mobile station may determine that the corresponding ranging procedure has failed (S506).

Accordingly, the mobile station restarts the ranging procedure (S507).

Figure 6:
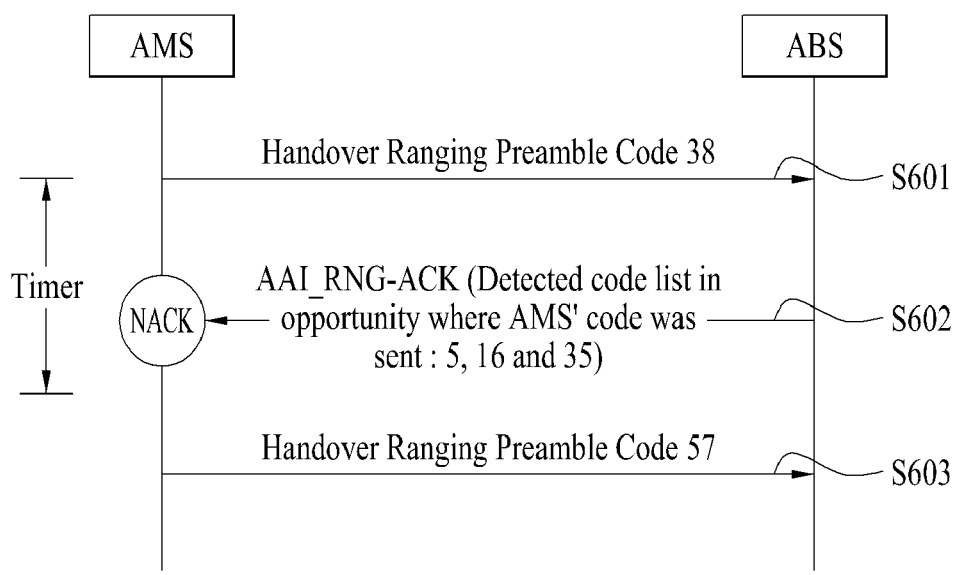
FIG. 6 illustrates yet another exemplary procedure for performing handover ranging according to an embodiment of the present invention.

FIG. 6 illustrates yet another exemplary procedure for performing handover ranging according to an embodiment of the present invention.

FIG. 6 assumes a situation after performing the process steps S201 to S205 of FIG. 2.

The mobile station transmits a handover ranging preamble code 38 to the target base station (S601).

Subsequently, the AAI_RNG-ACK message is received from the base station before the time point indicated by the RNG_ACK_TX_Time information is expired. Herein, the bit of the RNG-ACK bitmap corresponding to the ranging opportunity selected by the mobile station is '1', and codes 5, 16, and 35 are included in the corresponding bit (S602).

In this case, the mobile station may determine the above-described reception of the AAI_RNG-ACK message as an explicit negative acknowledgement (explicit-NACK) and may restart the ranging procedure, so as to transmit a randomly selected handover ranging preamble code 57 to the target base station (S603).

Second Embodiment

In the second embodiment of the present invention, a time point at which an AAI_RNG-ACK message is transmitted as a response to a ranging preamble code transmitted from the mobile station is defined, and an efficient initial ranging procedure is performed through the defined time point.

Hereinafter, an initial ranging process according to the embodiment of the present invention will be described in detail.

First of all, in the $X^{th}$ frame, the mobile station transmits an initial ranging preamble code to the base station through a ranging opportunity randomly selected from a plurality of ranging opportunities of an initial ranging purpose.

When at least one initial ranging preamble code is detected from the corresponding frame, the base station transmits an AAI_RNG-ACK message from the $X^{th}$ frame before a predetermined time (hereinafter referred to as a delay$_{INITIAL\_RNG\_ACK}$ for simplicity), which is set-up with respect to the initial ranging, is expired.

At this point, the delay$_{INITIAL\_RNG\_ACK}$ may be set up as a frame unit (e.g., 4 frames or more) or as a super-frame unit. More specifically, when the delay$_{INITIAL\_RNG\_ACK}$ value is equal to 1 super-frame, and when at least one initial ranging preamble code is detected from the plurality of initial ranging preamble codes assigned within a random super-frame, the base station should transmit an AAI_RNG-ACK message before the end of the next super-frame.

If the base station transmits an AAI_RNG-ACK message for a handover, a response for the corresponding initial ranging preamble codes detected along with a response for the handover ranging preamble code may also be transmitted.

Hereinafter, an AAI_RNG-ACK message according to the embodiment of the present invention will now be described in detail.

The AAI_RNG-ACK message includes bitmap information indicating a decoding status of a ranging preamble code received during each ranging (RNG) opportunity of at least one frame, and all initial ranging preamble codes that are successfully received through the ranging opportunities within each frame. At this point, the base station may omit the ranging preamble code of the mobile station, to which resource for transmitting the AAI_RNG-REQ is allocated, before the transmission time point of the AAI_RNG-ACK.

When a response for the initial ranging preamble codes, which are received through ranging opportunities within a plurality of frames, is included in the AAI_RNG-ACK message, frame index (or frame indicator) information may be included in the AAI_RNG-ACK message so as to indicate each frame. In case of the initial ranging process, when a ranging preamble code assigning a resource for transmitting the AAI_RNG-REQ before the time point designated by the delay$_{INITIAL\_RNG\_ACK}$ value exists, the response information of the corresponding code may be excluded from the AAI_RNG-ACK message.

In the embodiment of the present invention, depending upon whether or not the mobile station receives an AAI_RNG-ACK message, which includes a response to an initial ranging preamble code transmitted to a ranging opportunity selected by the mobile station itself, at or within a time point designated by the delay$_{INITIAL\_RNG\_ACK}$ value, the operations of the mobile station may be categorized as follows.

First of all, the mobile station receives an AAI_RNG-ACK message, and 1) when the above-described bitmap information indicates that there does not exist any ranging preamble code received by a ranging opportunity, wherein the ranging opportunity is selected by the mobile station, or 2) when a ranging preamble code transmitted by the mobile station with respect to the corresponding ranging opportunity is not included in the AAI_RNG-ACK message, and when the mobile station is not assigned with an uplink resource for the transmission of the AAI_RNG-ACK message from the base station, the mobile station may determine such instances as an explicit negative acknowledgement (explicit-NACK) response.

Conversely, when the mobile station fails to receive an AAI_RNG-ACK message, and when the mobile station fails to be assigned with an uplink resource for the AAI_RNG-ACK message transmission from the base station, the mobile station may determine such failure as an implicit negative acknowledgement (implicit-NACK) response.

Meanwhile, when the mobile station receives the AAI_RNG-ACK message, when a ranging preamble code having the above-described bitmap information received in the ranging opportunity selected by the mobile station exists, and when the ranging preamble code transmitted by the mobile station with respect to the corresponding ranging opportunity is included in the AAI_RNG-ACK message, the mobile station may determine such instances as an acknowledgement (ACK), i.e., the mobile station may determine that the ranging preamble code transmitted by the mobile station itself has been successfully received. Although the mobile station has determined a case as an ACK, if the mobile station fails to be assigned with an uplink resource for transmitting the AAI_RNG-ACK message from the base station, the mobile station starts the T3 timer. Thereafter, if the mobile station is assigned with the uplink resource before the time set on the T3 timer expires, the mobile station may stop the T3 timer. However, when the mobile station fails to be assigned with the uplink resource before the time set on the T3 timer expires, or when the mobile station determines a negative acknowledgment (i.e., implicit/explicit NACK), the mobile station determines that the corresponding ranging procedure has failed. Accordingly, the mobile station may restart the ranging procedure.

Hereinafter, the process steps of the initial ranging procedure according to the embodiment of the present invention will now be described in detail with reference to FIG. 7 to FIG. 9.

Figure 7:
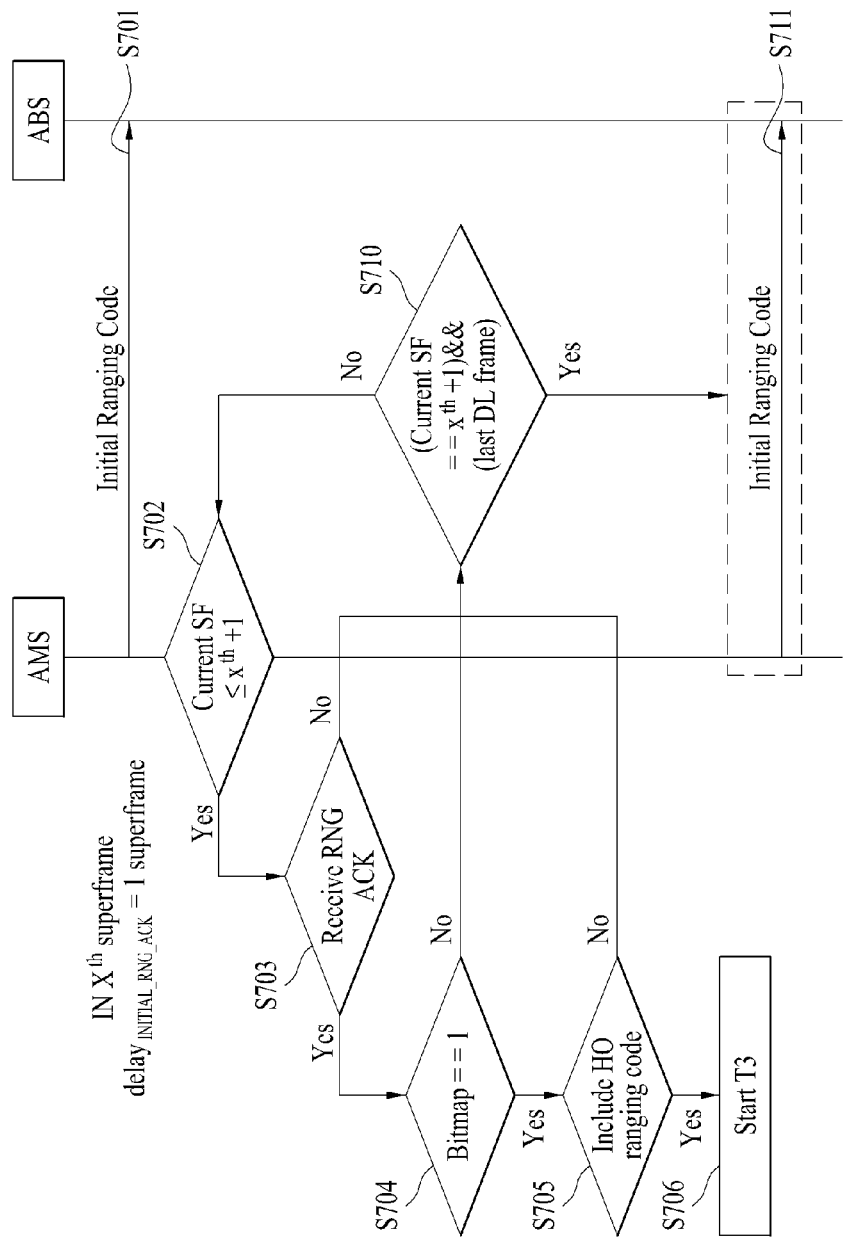
FIG. 7 illustrates an exemplary procedure for performing initial ranging according to an embodiment of the present invention.

FIG. 7 illustrates an exemplary procedure for performing initial ranging according to an embodiment of the present invention.

It is assumed in FIG. 7 that the delay$_{INITIAL\_RNG\_ACK}$ corresponds to 1 super-frame, that the mobile station transmits an initial ranging preamble code to the base station through a ranging opportunity for a random initial ranging process within the X$^{th}$ super-frame, and that the base station does not transmit any uplink allocation (or assignment) information for transmitting an AAI_RNG-REQ message to the mobile station within a period of Xth+delay$_{INITIAL\_RNG\_ACK}$. Furthermore, it is also assumed that a corresponding ranging preamble code information may be included without having the base station postpone the transmission of the AAI_RNG-ACK message until the time point designated by the delay$_{INITIAL\_RNG\_ACK}$ information.

Referring to FIG. 7, the mobile station transmits an initial ranging target to the base station through an initial ranging opportunity, which the mobile station has randomly selected in an X$^{th}$ super-frame (S701).

The mobile station waits for the AAI_RNG-ACK message to be transmitted from the base station up until the time point (i.e., Xth+delay$_{INITIAL\_RNG\_ACK}$ designated by the delay$_{INITIAL\_RNG\_ACK}$ is elapsed (i.e., until the current super-frame+1 super-frame) (S702).

If the AAI_RNG-ACK message is received within the above-described time point (S703), the mobile station determines whether or not a bit corresponding to the ranging opportunity, to which the mobile station has transmitted a ranging preamble code, is set to '1' in a bitmap (RNG-ACK) within the corresponding AAI_RNG-ACK message (S704).

Then, if the corresponding bit of the bitmap is set to '1', the mobile station determines whether or not the ranging preamble code, which the mobile station has transmitted, is included in the corresponding AAI_RNG-ACK message (S705).

In case the ranging preamble code transmitted by the mobile station itself is included in the message, the mobile station determines that the ranging preamble code has been successfully transmitted (i.e., ACK). Then, the mobile station starts the T3 timer and waits for the assignment of an uplink resource in order to transmit an AAI_RNG-REQ message (S706).

Based upon the results of step S702 to step S705, if at least one result is 'no', when the current super-frame corresponds to the X+1$^{th}$ super-frame, and when the current super-frame corresponds to a last downlink frame (S710), the mobile station then determines that the transmission of the ranging preamble code has failed, and the mobile station restarts the initial ranging procedure while taking into consideration the predetermined number of repeated attempts. Accordingly, the mobile station transmits a randomly selected ranging preamble code to the base station (S711).

At the determination point of step S710, when the current super-frame corresponds either to the X$^{th}$ super-frame or to the X+1$^{th}$ super-frame, and, yet, when the current super-frame does not correspond to the last downlink frame, the mobile station repeats the step S702.

Figure 8:
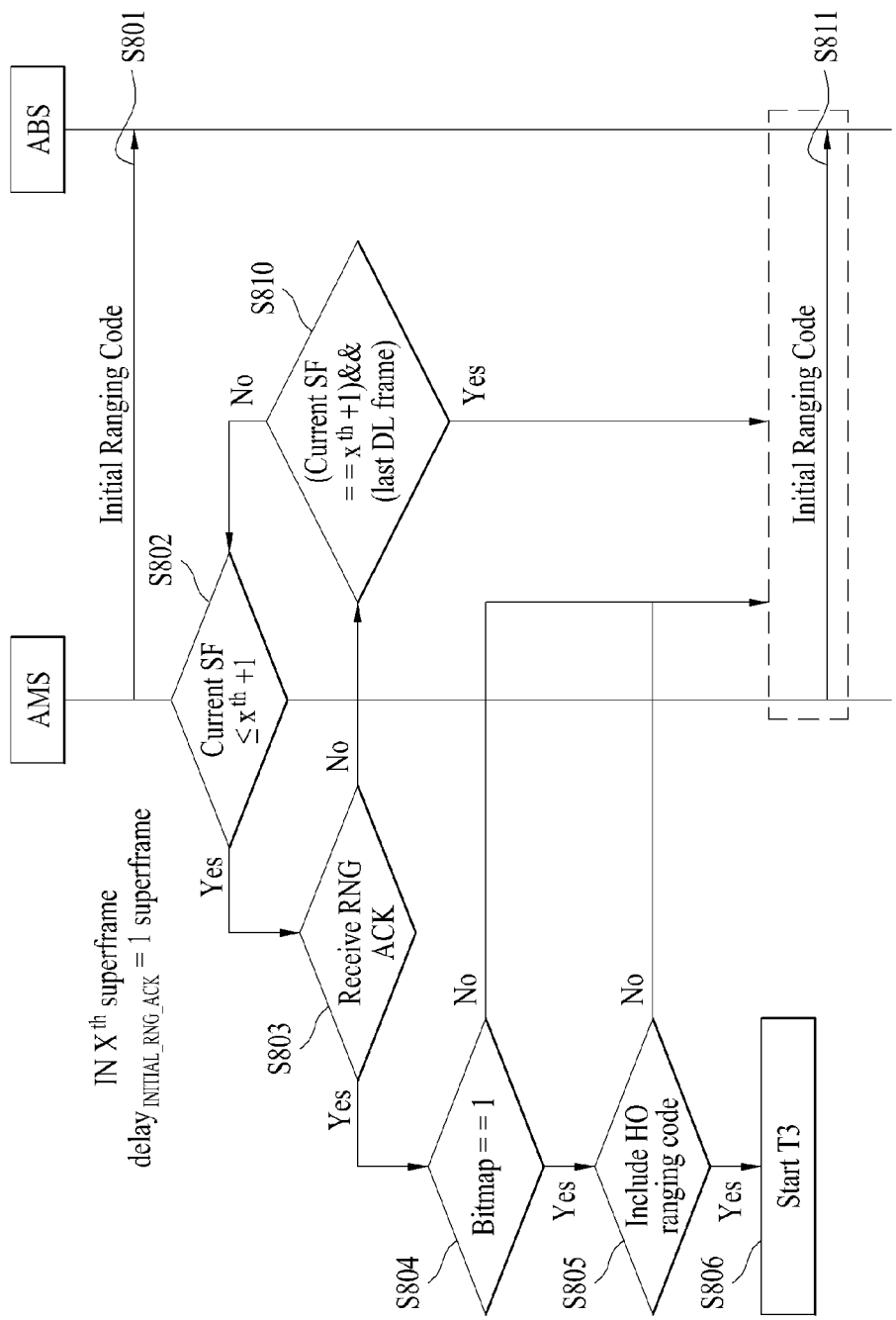
FIG. 8 illustrates another exemplary procedure for performing initial ranging according to an embodiment of the present invention.

FIG. 8 illustrates another exemplary procedure for performing initial ranging according to an embodiment of the present invention.

It is also assumed in FIG. 8 that the delay$_{INITIAL\_RNG\_ACK}$ corresponds to 1 super-frame, that the mobile station transmits an initial ranging preamble code to the base station through a ranging opportunity for a random initial ranging process within the X$^{th}$ super-frame, and that the base station does not transmit any uplink allocation (or assignment) information for transmitting an AAI_RNG-REQ message to the mobile station within a period of Xth+delay$_{INITIAL\_RNG\_ACK}$. However, it is also assumed that a corresponding ranging preamble code information must be included without having the base station postpone the transmission of the AAI_RNG-ACK message until the time point designated by the delay$_{INITIAL\_RNG\_ACK}$ information.

Referring to FIG. 8, the mobile station transmits an initial ranging target to the base station through an initial ranging opportunity, which the mobile station has randomly selected in an X$^{th}$ super-frame (S801).

The mobile station waits for the AAI_RNG-ACK message to be transmitted from the base station up until the time point (i.e., Xth+delay$_{INITIAL\_RNG\_ACK}$) designated by the delay INITIAL ACK is elapsed (i.e., until the current super-frame+1 super-frame) (S802).

If the AAI_RNG-ACK message is failed to be received within the above-described time point (S803), and even when the current super-frame corresponds either to the X$^{th}$ super-frame or to the X+1$^{th}$ super-frame, and, yet, when the current super-frame does not correspond to the last downlink frame, the mobile station repeats the step S802. Conversely, when the current super-frame corresponds the X+1$^{th}$ super-frame and also to the last downlink frame, it is determined that the corresponding initial ranging procedure has failed. And, accordingly, the initial ranging procedure is repeated while taking into account the predetermined number of repeated attempts. In order to do so, the ser equipment transmits a randomly selected initial ranging preamble code to the base station (S810 and S811).

If the AAI_RNG-ACK message is received within the time point designated by the delay$_{INITIAL\_RNG\_ACK}$, the mobile station determines whether or not a bit corresponding to the ranging opportunity, to which the mobile station has transmitted a ranging preamble code, is set to '1' in a bitmap (RNG-ACK) within the corresponding AAI_RNG-ACK message (S804).

Then, if the corresponding bit of the bitmap is set to '1', the mobile station determines whether or not the ranging preamble code, which the mobile station has transmitted, is included in the corresponding AAI_RNG-ACK message (S805).

In case the ranging preamble code transmitted by the mobile station itself is included in the message, the mobile station determines that the ranging preamble code has been successfully transmitted (i.e., ACK). Then, the mobile station starts the T3 timer and waits for the assignment of an uplink resource in order to transmit an AAI_RNG-REQ message (S806).

When a bit corresponding to a ranging opportunity, to which the mobile station itself has transmitted the ranging preamble code, is not set to '1' in the received AAI_RNG-ACK message, or when the corresponding bit is set to '1', yet when the code transmitted by the mobile station is not included in the message, the mobile station then determines that the corresponding ranging procedure has failed. In this case, the mobile station restarts the initial ranging procedure while taking into account the predetermined number of repeated attempts (S811).

Meanwhile, in the process steps of the initial ranging procedure according to the embodiment of the present invention, the processing time of the mobile station and the base station may be further considered. When it is assumed that the processing time of the base station is 3 sub-frames, it may be difficult for a response to the ranging preamble code transmitted from the mobile station to be included in the AAI_RNG-ACK message received before the time period of 3 sub-frames is elapsed. Therefore, limitations are required to be made in the base station or the mobile station. In order to do so, the embodiment of the present invention proposes that the base station always schedules the AAI_RNG-ACK message to the last downlink sub-frame of the respective super-frame. Alternatively, when the mobile station receives the AAI_RNG-ACK message from a sub-frame, which has transmitted an initial ranging preamble code to the base station, before the end of 3 sub-frames, the embodiment of the present invention may propose that the mobile station disregards (or ignores) the received message. This process will be described in detail with reference to FIG. 9.

Figure 9:
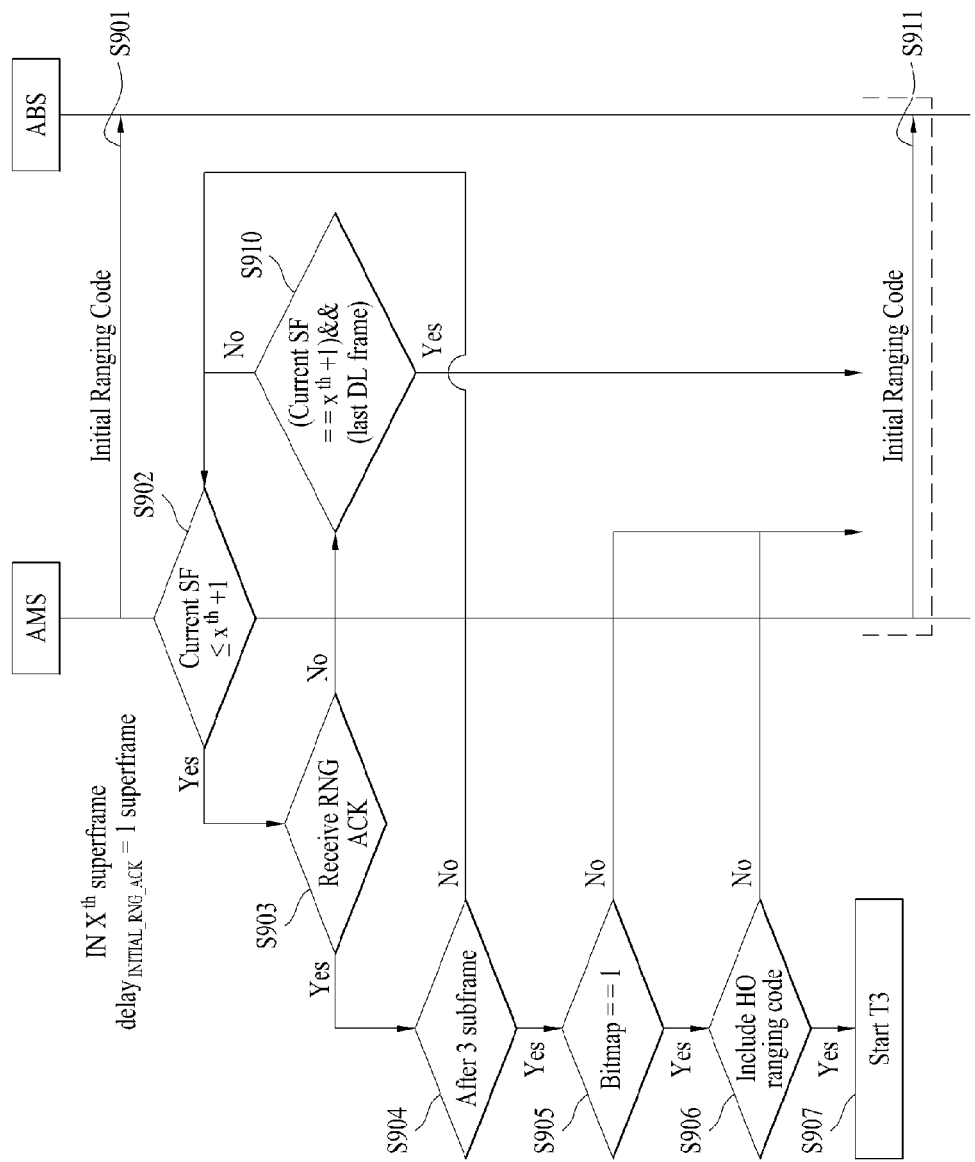
FIG. 9 illustrates yet another exemplary procedure for performing initial ranging according to an embodiment of the present invention.

FIG. 9 illustrates yet another exemplary procedure for performing initial ranging according to an embodiment of the present invention.

It is also assumed in FIG. 9 that the delay$_{INITIAL\_RNG\_ACK}$ corresponds to 1 super-frame, that the mobile station transmits an initial ranging preamble code to the base station through a ranging opportunity for a random initial ranging process within the X$^{th}$ super-frame, and that the base station does not transmit any uplink allocation (or assignment) information for transmitting an AAI_RNG-REQ message to the mobile station within a period of Xth+delay$_{INITIAL\_RNG\_ACK}$. Furthermore, it is also assumed that a corresponding ranging preamble code information must be included without having the base station postpone the transmission of the AAI_RNG-ACK message until the time point designated by the delay$_{INITIAL\_RNG\_ACK}$ information.

Referring to FIG. 9, each process steps of FIG. 9 is identical to each process steps of FIG. 8. However, in step S904, it is determined whether a time period of 3 sub-frames has elapsed. Taking into account the initial ranging preamble code processing time of the base station, when it is assumed that the processing time of the base station is equal to 3 sub-frames, if the mobile station receives an AAI_RNG-ACK message from the sub-frame, which has transmitted an initial ranging preamble code to the base station, before the end of 3 sub-frames, the mobile station disregards (or ignores) the received message and returns to the process step S902.

In FIG. 9, with the exception for the addition of the process step S1904, the other process steps of FIG. 9 are identical to those of FIG. 8. Therefore, a detailed description of the same will be omitted for simplicity.

In another aspect of the embodiment of the present invention, it is proposed that, if the transmission of the AAI_RNG-ACK message is omitted, the mobile station recognizes such omission as an implicit acknowledgment (implicit-ACK).

Hereinafter, the operations of the base station and the mobile station will now be described according to another embodiment of the present invention.

First of all, the base station transmits an AAI_RNG-ACK message from a frame, wherein at least one initial ranging preamble code is detected, within a time point designated by the delay$_{INITIAL\_RNG\_ACK}$ value. The AAI_RNG-ACK message includes bitmap information indicating a decoding status of a ranging preamble code received during each ranging (RNG) opportunity of a frame indicated by a frame indicator field, and all initial ranging preamble codes that are successfully received through the ranging opportunities within the corresponding frame. At this point, the base station may omit the ranging preamble code of the mobile station, to which the resource for transmitting the AAI_RNG-REQ is allocated, before the transmission time point of the AAI_RNG-ACK.

If the response of any successfully received ranging preamble code is not included in the AAI_RNG-ACK message, the base station may omit the transmission of the corresponding message.

Additionally, even when the decoding status of the ranging preamble codes received during each ranging (RNG) opportunity of a frame indicated by the frame indicator field are all 'success', the base station may omit the transmission of the AAI_RNG-ACK message. However, this case may be applied only when a handover ranging preamble code is not included among the ranging preamble codes detected within the AAI_RNG-ACK message.

In case of the mobile station, if the AAI_RNG-ACK message indicates that there is no ranging preamble code successfully received in the ranging opportunity, to which the mobile station itself has transmitted an initial ranging preamble code, or if the ranging preamble code transmitted by the mobile station itself does not exist, it is determined that the corresponding ranging procedure has failed, and, accordingly, the initial ranging procedure may be restarted. However, in other cases, the mobile station may determine that the transmission of the corresponding ranging preamble code has been successful.

Since the base station cannot omit the transmission of the AAI_RNG-ACK message, even if the mobile station fails to receive a respective RNG-ACK within a respective transmission time point, the mobile station that has transmitted the initial ranging preamble code may determine the response made from the base station with respect to the code transmitted by the mobile station itself as an implicit acknowledgement (implicit-ACK). Therefore, in this case, the mobile station does not re-transmit a ranging preamble code, even when the mobile station fails to receive an AAI_RNG-ACK message within the corresponding transmission time point.

When using the above-described method, unlike the handover ranging procedure, since a sensitivity level for quickly completing the procedure is not high in the initial ranging procedure, signaling overhead may be reduced in the initial ranging procedure. Hereinafter, the above-described method will be described in more detail with reference to FIG. 10 and FIG. 11.

Figure 10:
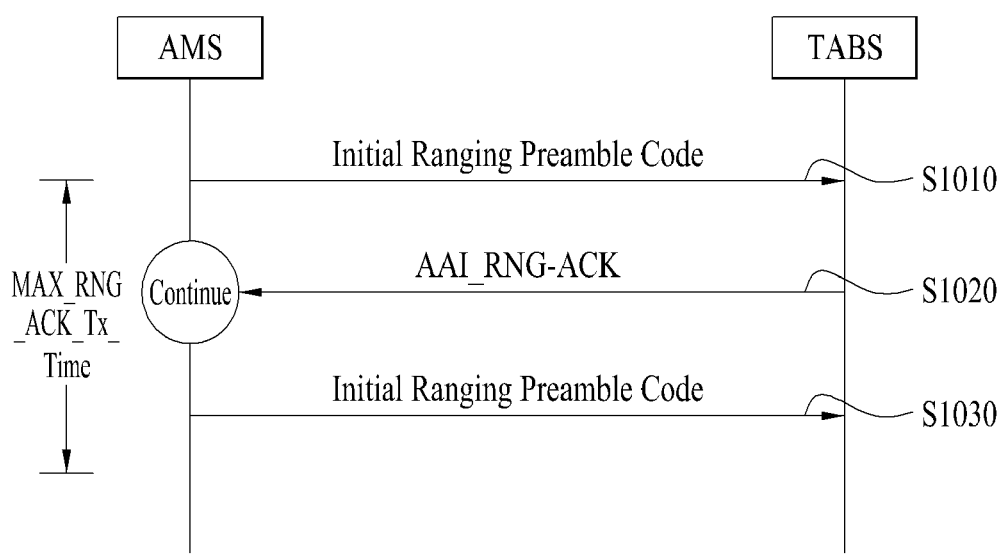
FIG. 10 illustrates an exemplary procedure for performing handover ranging according to another embodiment of the present invention.

FIG. 10 illustrates an exemplary procedure for performing handover ranging according to another embodiment of the present invention.

Referring to FIG. 10, the mobile station first transmits an initial ranging preamble code to the base station (S1010).

Accordingly, the base station transmits an AAI_RNG-ACK message to the mobile station within a time point designated by the delay$_{INITIAL\_RNG\_ACK}$ value (S1020).

At this point, since the ranging status indicates 'continue' as a response to the corresponding ranging preamble code in the AAI_RNG-ACK message, the mobile station applies a physical parameter compensation value included in the corresponding message, so as to re-transmit the initial ranging preamble code (S1030).

Figure 11:
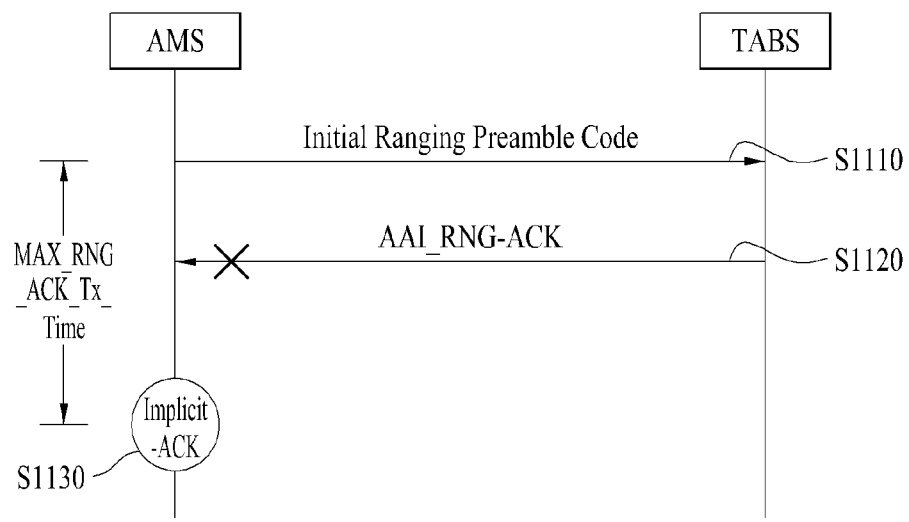
FIG. 11 illustrates another exemplary procedure for performing handover ranging according to another embodiment of the present invention.

FIG. 11 illustrates another exemplary procedure for performing handover ranging according to another embodiment of the present invention.

Referring to FIG. 11, the mobile station first transmits an initial ranging preamble code to the base station (S1110).

At this point, when the base station fails to receive a handover ranging preamble code at the corresponding time point, and when the reception status of all detected initial ranging preamble codes (including the codes transmitted by the mobile station in process step S1110) is 'success', the transmission of the AAI_RNG-ACK message may be omitted (S1120).

Accordingly, even when the mobile station fails to receive the AAI_RNG-ACK message even after the time point designated by the delay$_{INITIAL\_RNG\_ACK}$ value has elapsed, the mobile station may determine the response made by the base station with respect to the code transmitted by the mobile station itself as an implicit acknowledgement (implicit-ACK).

Meanwhile, the above-described process steps of the initial ranging procedure according to the embodiment of the present invention may be similarly applied to a periodic ranging procedure.

Hereinafter, an example of the above-described embodiments of the present invention being performed in combination will be described in detail with reference to FIG. 12.

Figure 12:
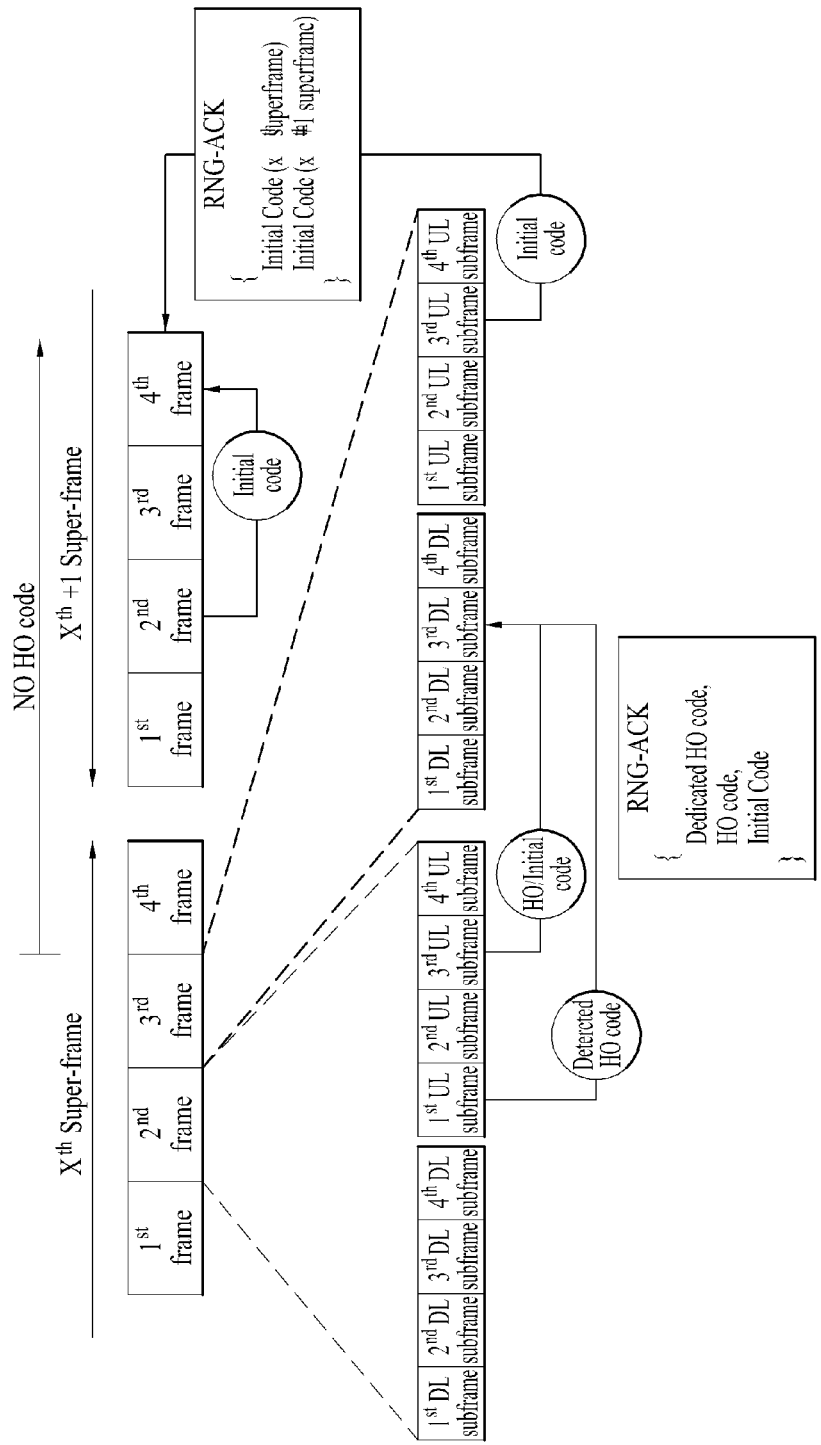
FIG. 12 illustrates an example of a handover ranging procedure according to an embodiment of the present invention and an initial ranging procedure according to another embodiment of the present invention being simultaneously performed.

FIG. 12 illustrates an example of a handover ranging procedure according to an embodiment of the present invention and an initial ranging procedure according to another embodiment of the present invention being simultaneously performed.

In FIG. 12, it is assumed that a delay$_{INITIAL\_RNG\_ACK}$ value for handover is pre-defined as 1 frame, and that a delay$_{INITIAL\_RNG\_ACK}$ value for initial/periodic ranging is pre-defined as 1 super-frame.

Referring to FIG. 12, a designated handover ranging preamble code is received in a first uplink sub-frame and a handover ranging preamble code and an initial ranging preamble code are received in a third uplink sub-frame of a $2^{nd}$ frame within an $X^{th}$ super-frame. In case of the handover ranging preamble code, since the delay$_{INITIAL\_RNG\_ACK}$ value is equal to 1 frame, the AAI_RNG-ACK message is transmitted to the third sub-frame from the downlink sub-frame. The AAI_RNG-ACK message includes a response to a handover ranging preamble code received in a previous frame. At this point, the AAI_RNG-ACK message may also include a response to an initial ranging preamble code received in the previous frame.

Thereafter, although an initial ranging preamble code is detected from the third uplink sub-frame of the third frame, since the delay$_{INITIAL\_RNG\_ACK}$ value for the initial/periodic ranging is equal to 1 super-frame, a response for the corresponding initial ranging preamble code is not absolutely required to be transmitted within the $X^{th}$ super-frame, instead it suffices to be transmitted within the $X+1^{th}$ super-frame. An AAI_RNG-ACK message is transmitted from a fourth frame of the $X+1^{th}$ super-frame, and a response respective to two initial ranging preamble codes prior to the transmission point (i.e., a third frame of the $X+1^{th}$ super-frame and a second frame of the $X+1^{th}$ super-frame) may be included in the AAI_RNG-ACK message.

Meanwhile, allocation (or assignment) information of the AAI_RNG-ACK message including a response to a designated ranging preamble code may be delivered (or sent) to the mobile station through a downlink basic assignment map information element (DL basic assignment A-MAP IE) using unicast STID, and not through a broadcast assignment map information element (broadcast assignment A-MAP IE) using a broadcast masking code. Furthermore, assignment information for each of the AAI_RNG-REQ message and the AAI_RNG-RSP message may be respectively delivered (or sent) to the mobile station through an uplink basic assignment map information element (UL basic assignment A-MAP IE) and a downlink basic assignment map information element (DL basic assignment A-MAP IE) both using unicast STID.

Hereinafter, a format of the AAI_RNG-ACK message according to the embodiment of the present invention will be described in detail with reference to Table 1 to Table 3.

First of all, Table 1 shown below describes an exemplary AAI_RNG-ACK message format, when the delay$_{INITIAL\_RNG\_ACK}$ value is equal to 1 super-frame.

TABLE 1

| Syntax | Size (bits) | Notes |
|---|---|---|
| RNG-ACK_Message_Format ( ) { | — | — |
|     Management Message Type=TBD | 8 | — |
|     Number of frames (N_Frames) | 3 | The number of frame indices included in this RNG-ACK message |
|     For (k=0; k<N_Frames; k++) { | | |
|         Frame index (Frame Indicator) | 3 | 0b000 : the 1st frame in a previous superframe; 0b001 : the 2nd frame in a previous superframe; 0b010 : the 3rd frame in a previous superframe ; 0b011 : the 4th frame in a previous superframe; 0b100 : the 1st frame in the current superframe; 0b101 : the 2nd frame in the current superframe; 0b110 : the 3rd frame in the current superframe ; 0b111 : the 4th frame in the current superframe |
|         RNG-ACK Bitmap | N_RNG_Slots | Each bit indicates the decoding status of ranging code in the corresponding ranging opportunity. 0b0: No ranging code is detected, 0b1: At least one code is detected. |
|         For (i=0; i<N_RNG_Slots; i++) {             If (RNG-ACK Bitmap[i] == 1) { | — | — |
|                 Number of Received codes (L) | 5 | The number of ranging code indices included in this RNG-ACK message. |
|                 For (j=0; j<L; j++) { | | |
|                       Code index | 8 | Code index received in the ranging opportunity |

TABLE 1-continued

| Syntax | Size (bits) | Notes |
|---|---|---|
| Ranging status | 2 | Used to indicate whether UL messages are received within acceptable limits by BS. 0b01 = continue, 0b11 = abort, 0b00 = success |
| If (Ranging status == 0b01) { | — | |
| API | 3 | Adjustment parameters indication Bit#0:"1"Timing Offset Adjustment is included; Bit#1:"1"Power Level Adjustment is included; Bit#2:"1"Frequency Offset Adjustment is included; |
| If( API bit#0==1){ Timing Offset Adjustment } | 14 | Tx timing offset adjustment |
| If (API bit#1==1){ Power Level Adjustment} | 3 | Tx Power offset adjustment |
| If (API bit#2==1) { Frequency Offset Adjustment } } } }} | 8 | Tx frequency offset adjustment |

Referring to Table 1, under the assumption that the delay$_{INITIAL\_RNG\_ACK}$ value is equal to 1 super-frame, the AAI_RNG-ACK message may include response information respective to each code received in ranging opportunities within a maximum range of 8 frames. For this, a frame index (frame indicator) field is configured of 3 bits. And, when the first bit is equal to '0', the frame index field may designate (or indicate) the previous super-frame, and when the first bit is equal to '1', the frame index field may designate (or indicate) the current super-frame.

Subsequently, Table 2 shown below describes another exemplary AAI_RNG-ACK message format, when the delay$_{INITIAL\_RNG\_ACK}$ value is equal to 1 super-frame.

TABLE 2

| Syntax | Size (bits) | Notes |
|---|---|---|
| RNG-ACK_Message_Format( ) { | — | — |
| Management Message Type=TBD | 8 | — |
| Number of frames (N_Frames) | 3 | The number of frame indices included in this RNG-ACK message |
| For (k=0; k<N_Frames; k++) { | | |
| Frame index (Frame Indicator) | 3 | Bit #0 : LSB 1bit of superframe number, Bit #1~2 : frame index in a superframe |
| RNG-ACK Bitmap | N_RNG_Slots | Each bit indicates the decoding status of ranging code in the corresponding ranging opportunity. 0b0: No ranging code is detected, 0b1: At least one code is detected. |
| For (i=0; i<N_RNG_Slots; i++) { | | |
| If (RNG-ACK Bitmap[i] == 1) { | | — |
| Number of Received codes (L) | 5 | The number of ranging code indices included in this RNG-ACK message. |
| For (j=0; j<L; j++) { | | — |
| Code index | 8 | Code index received in the ranging opportunity |
| Ranging status | 2 | Used to indicate whether UL messages are received within acceptable limits by BS. 0b01 = continue, 0b11 = abort, 0b00 = success |
| If (Ranging status == 0b01) { | — | |
| API | 3 | Adjustment parameters indication Bit#0:"1"Timing Offset Adjustment is included; Bit#1:"1"Power Level Adjustment is included; |

TABLE 2-continued

| Syntax | Size (bits) | Notes |
|---|---|---|
| | | Bit#2:"1"Frequency Offset Adjustment is included; |
| If( API bit#0==1){ Timing Offset Adjustment } | 14 | Tx timing offset adjustment |
| If (API bit#1==1){ Power Level Adjustment} | 3 | Tx Power offset adjustment |
| If (API bit#2==1) { Frequency Offset Adjustment } } } } }} | 8 | Tx frequency offset adjustment |

Referring to Table 2, under the assumption that the delay$_{INITIAL\_RNG\_ACK}$ value is equal to 1 super-frame, the AAI_RNG-ACK message may include response information respective to each code received in ranging opportunities within a maximum range of 8 frames. For this, a frame index (frame indicator) field is configured of 3 bits. Herein, each frame may be designated by using a method wherein the first bit indicates an LSB value of a super-frame number.

Furthermore, Table 3 shown below describes yet another exemplary AAI_RNG-ACK message format, when the delay$_{INITIAL\_RNG\_ACK}$ value is equal to or more than 2 super-frames.

TABLE 3

| Syntax | Size (bits) | Notes |
|---|---|---|
| RNG-ACK_Message_Format( ) { | — | — |
| Management Message Type=TBD | 8 | — |
| Number of frames (N_Frames) | 3 | The number of frame indices included in this RNG-ACK message |
| For (k=0; k<N_Frames; k++) { | | |
| Frame index (Frame Indicator) | TBD (4 bit or more) | Bit #0 ~ TBD −1 : LSB TBD bit of superframe number, Bit # TBD~TBD+1 : frame index in a superframe |
| RNG-ACK Bitmap | N_RNG_Slots | Each bit indicates the decoding status of ranging code in the corresponding ranging opportunity. 0b0: No ranging code is detected, 0b1: At least one code is detected. |
| For (i=0; i<N_RNG_Slots; i++) { If (RNG-ACK Bitmap[i] == 1 ) { | | — |
| Number of Received codes (L) | 5 | The number of ranging code indices included in this RNG-ACK message. |
| For (j=0; j<L; j++) { | | — |
| Code index | 8 | Code index received in the ranging opportunity |
| Ranging status | 2 | Used to indicate whether UL messages are received within acceptable limits by BS. 0b01 = continue, 0b11 = abort, 0b00 = success |
| If (Ranging status == 0b01) { | | — |
| API | 3 | Adjustment parameters indication Bit#0:"1"Timing Offset Adjustment is included; Bit#1:"1"Power Level Adjustment is included; Bit#2:"1"Frequency Offset Adjustment is included; |
| If( API bit#0==1){ Timing Offset Adjustment } | 14 | Tx timing offset adjustment |
| If (API bit#1==1){ Power | 3 | Tx Power offset adjustment |

TABLE 3-continued

| Syntax | Size (bits) | Notes |
|---|---|---|
| Level Adjustment} } If (API bit#2==1) { Frequency Offset Adjustment } } } } }} | 8 | Tx frequency offset adjustment |

Referring to Table 3, under the assumption that the delay$_{INITIAL\_RNG\_ACK}$ value is equal to or greater than 2 superframes, the number of bits of a frame field may vary in the AAI_RNG-ACK message depending upon the size of the delay$_{INITIAL\_RNG\_ACK}$ value. At this point, the last bit and the previous bit of the last bit collectively indicate a frame number within the super-frame, and the remaining bits may indicate the LSB value of the super-frame.

Meanwhile, when the index of the detected dedicated ranging preamble code is equal to or greater than 64, the base station should notify the user terminal that the code index is equal to or greater than 64, when the base station transmits an AAI_RNG-ACK message respective to the code index to the mobile station. Accordingly, a size of the ranging preamble code index may be included in the AAI_RNG-ACK message.

Herein, the size of the ranging preamble code index may be set-up (or determined) as described below.

More specifically, when the code index is set to '0b0', the size of the code index is equal to 6 bits, and when the code index is set to '0b1', the size of the code index is equal to 8 bits. If the size of the ranging preamble code index value is equal to '1', the size of all ranging preamble code index fields within the corresponding ranging opportunity is equal to 8 bits.

Structure of the Mobile Station and the Base Station

Hereinafter, as another embodiment of the present invention, the mobile station and base station (FBS and MBS) wherein the above-described embodiments of the present invention may be performed will be described in detail.

The mobile station may operate as a transmitter in the uplink and may operate as a receiver in the downlink. Also, the base station may operate as a receiver in the uplink and may operate as a transmitter in the downlink. More specifically, the mobile station and the base station may include a transmitter and a receiver so as to transmit information or data.

The transmitter and the receiver may include a processor, a module, a part and/or means for performing the embodiments of the present invention. Particularly, the transmitter and the receiver may include a module (or means) for encoding (or encrypting) a message, a module for interpreting an encoded (or encrypted) message, an antenna for transmitting and receiving messages, and so on. An example of such transmitting end and receiving end will be described in detail with reference to FIG. 13.

Figure 13:
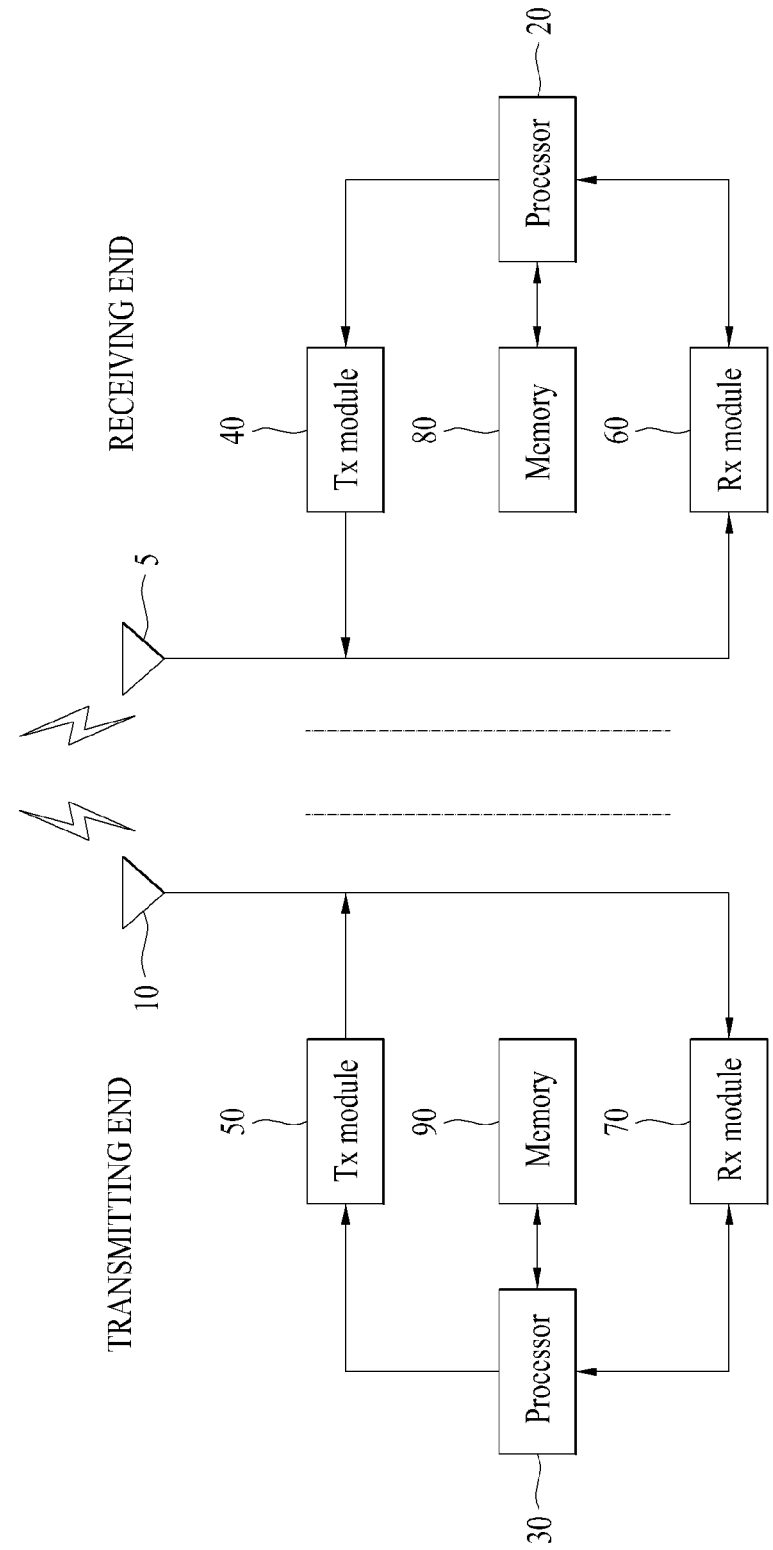
FIG. 13 illustrates a block view showing structures of a transmitting end and a receiving end according to another embodiment of the present invention.

FIG. 13 illustrates a block view showing structures of a transmitting end and a receiving end according to another embodiment of the present invention.

Referring to FIG. 13, the left side represents the structure of the transmitting end, and the right side represents the structure of the receiving end. Each of the transmitting end and the receiving end may include an antenna 5 and 10, a processor 20 and 30, a transmission module (Tx module) 40 and 50, a receiving module (Rx module) 60 and 70, and a memory 80 and 90. Each element may perform its corresponding function. Hereinafter, each element will now be described in detail.

The antenna 5 and 10 either transmits a signal created from the Tx module 40 and 50 to the outside, or receives a wireless signal from the outside, thereby delivering the received signal to the Rx module 60 and 70. When a Multiple-Input Multiple-Output (MIMO) antenna function is supported, at least 2 or more antennae may be provided herein.

The antenna, the Tx module, and the Rx module may collectively configure a wireless communication (or radio frequency (RF)) module.

The processor 20 and 30 generally controls the overall operations of the transmitting end or the receiving end. For example, the processor may perform a controller function for performing the above-described embodiments of the present invention, a MAC (Medium Access Control) frame variable control function based upon service characteristics and frequency environment (or condition), a hand over function, and authentication and encoding (or encryption) functions. More specifically, the processor 20 and 30 may perform an overall controlling function for performing the above-described system information transmission/updating procedures.

Particularly, the processor of the mobile station performs a control function so as to select a ranging preamble code and to transmit the selected ranging preamble code to the base station through a ranging opportunity best-fitting the ranging purpose. Also, the processor of the mobile station waits for an AAI_RNG-ACK message according to the corresponding ranging purpose until a predetermined time point. And, when the corresponding message is received, the processor of the mobile station uses the received message to verify the reception status of the transmitted ranging preamble code, thereby determining the subsequent operation step.

In addition, the processor of the mobile station may perform an overall control of the operation process steps disclosed in the above-described embodiments of the present invention.

The Tx module 40 and 50 may perform predetermined coding and modulation processes on the data scheduled by the processor 20 and 30 and to be transmitted to the outside, thereby delivering the processed data to the antenna 10.

The Rx module 60 and 70 may perform decoding and demodulation processes on a wireless signal received from the outside through the antenna 5 and 10, so as to recover the processed data to the original (or initial) state, thereby delivering the recovered data to the processor 20 and 30.

A program for processing and controlling the processor 20 and 30 may be stored in the memory 80 and 90. The memory 80 and 90 may also perform functions for temporarily storing input/output data. Furthermore, the memory 80 and 90 may include at least one type of storage means, such as a flash memory type, a hard disk type, a multimedia card micro type, a card-type memory (e.g., SD or XD memory), a RAM (Random Access Memory), a SRAM (Static Random Access Memory), a ROM (Read-Only Memory), an EEPROM (Electrically Erasable Programmable Read-Only Memory), a PROM (Programmable Read-Only Memory), a magnetic memory, a magnetic disk, and an optical disk.

Meanwhile, the base station and the relay station may perform a controller function for performing the above-described embodiments of the present invention, an OFDMA (Orthogonal Frequency Division Multiple Access) packet scheduling, TDD (Time Division Duplex) packet scheduling, and channel multiplexing functions, MAC frame variable control function based upon service characteristics and frequency environment (or condition), a high-speed traffic real-time control function, a hand over function, authentication and encoding (or encryption) functions, packet modulation/demodulation functions for transmitting data, a high-speed channel coding function, and a real-time modem control function through at least one of the above-described modules, or the base station may further include a separate means, module, or part for performing such functions.

As described above, the method for a mobile station and a base station to perform an efficient ranging procedure considering a ranging purpose and the device for performing the same have the following advantages.

According to at least one embodiment of the present invention, a ranging procedure may be efficiently performed by using a comparatively small overhead.

Also, by applying a ranging acknowledgement message transmission time in accordance with (or considering) the ranging purpose, procedures up to the handover procedure may be efficiently performed so that the system requirements can be satisfied.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of a mobile station for performing ranging in a broadband wireless access system, the method comprising:
    transmitting a first ranging preamble code for a ranging procedure to a base station through a first ranging opportunity of a first frame; and determining whether or not the ranging procedure is successful based on at least one of a timer indicating a time limit, a first message transmitted by the base station, and uplink resource allocation information for transmitting a second message to the base station,
    wherein the first message comprises a frame index indicating a frame containing ranging opportunities to which the first message refers, a bitmap indicating a decoding status of the ranging opportunities in the frame indicated by the frame index, and at least one index of a ranging preamble code decoded successfully from the ranging opportunities,
    wherein if the first message has been received from the base station before the timer expires but the at least one index of the ranging preamble code included in the first message does not correspond to the first ranging preamble code transmitted by the mobile station, the ranging procedure is determined to be failed, and
    wherein if the uplink resource allocation information has been received solely without receiving the first message before the timer expires, the ranging procedure is determined to be successful.

2. The method of claim 1, wherein if the first message has been received from the base station before the timer expires, the ranging procedure is determined to be successful only when the frame index indicates the first frame, a bit for the first opportunity in the bitmap is set to 1, and the at least one index corresponds to the first ranging preamble code.

3. The method of claim 1, wherein the first message is a ranging acknowledgement ($AAI_{13}$ RNG-ACK) message, the second message is a ranging request (AAI_RNG-REQ) message, and the timer is a T31 timer.

4. A method of a base station for performing ranging in a broadband wireless access system, the method comprising:
    detecting at least one ranging preamble code for a ranging procedure by decoding at least one ranging opportunity in a frame; and
    transmitting at least one of a first message and uplink resource allocation information for receiving a second message to at least one mobile station which has transmitted the at least one detected ranging preamble code, before a timer expires,
    wherein the first message comprises a frame index indicating the frame, a bitmap indicating a decoding status of the ranging opportunity in the frame, and each index of the at least one ranging preamble code decoded from the ranging opportunities,
    wherein if the first message has been received in a first mobile station before the timer expires but the each index of the at least one ranging preamble code included in the first message does not correspond to a first ranging preamble code transmitted by the first mobile station, a ranging procedure of the first mobile station is determined to be failed, and
    wherein if the uplink resource allocation information has been received in the first mobile station solely without receiving the first message before the timer expires, the ranging procedure of the first mobile station is determined to be successful.

5. The method of claim 4, wherein the frame index comprises at least one bit indicating a super-frame including the frame, and at least one bit indicating the frame among frames within the super-frame.

6. The method of claim 4, wherein the first message is a ranging acknowledgement (AAI_RNG-ACK) message, the second message is a ranging request (AAI_RNG-REQ) message, and the timer is a T31 timer.

7. A mobile station for performing ranging in a broadband wireless access system, the mobile station comprising:
    a processor; and
    a radio frequency (RF) module is configured to transmit and receive radio frequency signals to and from the outside under a control of the processor,
    wherein the processor transmits a first ranging preamble code for a ranging procedure to a base station through a first ranging opportunity of a first frame, and determines whether or not the ranging procedure is successful based on at least one of a. timer indicating a time limit, a first message transmitted by the base station, and uplink resource allocation information for transmitting a second message to the base station,
    wherein the first message comprises a frame index indicating a frame containing ranging opportunities to which the first message refers, a bitmap indicating a decoding status of the ranging opportunities in the frame indicated by the frame index, and at least one index of a ranging preamble code decoded successfully from the ranging opportunities,
    wherein if the first message has been received from the base station before the timer expires but the at least one index of the ranging preamble code included in the first message does not correspond to the first ranging preamble code transmitted by the mobile station, the ranging procedure is determined to be failed, and wherein if the uplink resource allocation information has been received solely without receiving the first message before the timer expires, the ranging procedure is determined to be successful.

8. The mobile station of claim 7, wherein if the first message has been received from the base station before the timer expires, the ranging procedure is determined to be successful only when the frame index indicates the first frame a bit for the first opportunity in the bitmap is set to 1, and the at least one index of the ranging preamble code corresponds to the first ranging preamble code.

9. The mobile station of claim 7, wherein the first message is a ranging acknowledgement (AAI_RNG-ACK) message, the second message is a ranging request (AAI_RNG-REQ) message, and the timer is a T31 timer.

\* \* \* \* \*